US006904598B2

(12) United States Patent
Abileah et al.

(10) Patent No.: US 6,904,598 B2
(45) Date of Patent: *Jun. 7, 2005

(54) COBOL METAMODEL

(75) Inventors: Shahaf Abileah, Portland, OR (US); Alan Roeder Elderon, Mountain View, CA (US); Shyh-Mei F. Ho, Cupertino, CA (US); James Rush Rhyne, II, Los Gatos, CA (US); William Nicholas John Tindall, San Martin, CA (US); Tony Y Tsai, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 739 days.

This patent is subject to a terminal disclaimer.

(21) Appl. No.: 09/849,813

(22) Filed: May 4, 2001

(65) Prior Publication Data

US 2002/0056012 A1 May 9, 2002

Related U.S. Application Data

(60) Provisional application No. 60/223,671, filed on Aug. 8, 2000.

(51) Int. Cl.[7] .............................. G06F 3/00; G06F 9/44; G06F 9/46; G06F 13/00
(52) U.S. Cl. ....................................... 719/319; 719/313
(58) Field of Search ................................. 719/310, 319, 719/320, 328, 329, 313–318; 709/201–203

(56) References Cited

U.S. PATENT DOCUMENTS

| | | | | |
|---|---|---|---|---|
| 6,094,688 A | * | 7/2000 | Mellen-Garnett et al. ... | 719/328 |
| 6,233,542 B1 | * | 5/2001 | Butts et al. .................... | 703/27 |
| 6,253,366 B1 | * | 6/2001 | Mutschler, III ............. | 717/104 |
| 6,654,784 B1 | * | 11/2003 | Wei ............................. | 709/203 |
| 6,738,975 B1 | * | 5/2004 | Yee et al. .................... | 719/310 |
| 2003/0191970 A1 | * | 10/2003 | Devine et al ................ | 713/201 |

OTHER PUBLICATIONS

James Martin, "Principles of Object–Oriented Analysis and Design", Oct. 29, 1992, Chapter 1–22.
"Quarterdeck Mosaic User Guide", 1995, Chapters 1–7.

* cited by examiner

Primary Examiner—Meng-Al T. An
Assistant Examiner—Diem K. Cao
(74) Attorney, Agent, or Firm—Sughrue Mion, PLLC

(57) ABSTRACT

A method of and a system for processing an enterpise an application request on an end user application and an application server. This is accomplished by initiating the application request on the end user application in a first language (such as a markup language) with a first application program (such as a Web browser), and transmitting the application request to the server and converting the application from the first language of the first end user application to a language running on the application server, processing the application request on the application server, and transmitting the response from the application server back to the end user application, and converting the response from the language running on the application server to the language of the end user application. The end user application and the application server have at least one connector between them, and the steps of (i) converting the application request from the language of the end user application (as a source language) to the language running on the application server (as a target language), and (ii) converting the response to the application request from the language running on the application server (as a source language) to the language of the end user application (as a target language), each include the steps of invoking connector metamodels of the respective source and target languages, populating the connector metamodels with metamodel data of each of the respective source and target languages, and converting the source language to the target language.

50 Claims, 13 Drawing Sheets

| <<enumeration>> bitModePad |
|---|
| mode16 |
| mode24 |
| mode31 |
| mode32 |
| mode64 |
| mode128 |

| <<enumeration>> packedDecimalSign |
|---|
| MVS |
| MVSCustom |
| NT_OS2_AIX |

| <<enumeration>> accessor |
|---|
| ReadOnly |
| WriteOnly |
| ReadWrite |
| NoAccess |

| <<enumeration>> floatType |
|---|
| Unspecified |
| IEEEextendedIntel |
| IEEEextendedAIX |
| IEEEextendedOS390 |
| IEEEextendedAS400 |
| IEEEnonextended |
| IBM390Hex |
| IBM400Hex |

| <<enumeration>> lengthEncoding |
|---|
| fixedLength |
| lengthPrefixed |
| nullTerminated |

| <<enumeration>> signCoding |
|---|
| twosComplement |
| onesComplement |
| signMagnitude |
| zoneSigns |
| packedSigns |
| unsignedBinary |
| unsignedDecimal |

| <<enumeration>> addrUnit |
|---|
| bit |
| byte |
| word |
| doubleWord |

FIG. 12

COBOL METAMODEL

CROSS REFERENCE TO RELATED APPLICATIONS

This application claims the benefit under Title 35, United States Code, Sections 111(b) and 119(e), relating to Provisional Patent Applications, of the filing date of U.S. Provisional Patent Application Ser. No. 60/223,671 filed Aug. 8, 2000 of Steven A. Brodsky and Shyh-Mei Ho for EAI Common Application Metamodel.

This application is also related to the following United States Patent Applications, filed on even date herewith:

COMMON APPLICATION METAMODEL by Shyh-Mei Ho, Stephen Brodsky, and James Rhyne; a pending application filed on May 4, 2001 and assigned application Ser. No. 09/849,107.

PL/I METAMODEL by Shyh-Mei Ho, Peter Elderon, Eugene Dong and Tony Tsai; a pending application filed on May 4, 2001 and assigned application Ser. No. 09/849,563.

HIGH LEVEL ASSEMBLER METAMODEL by Shyh-Mei Ho, John Ehrman, Benjamin Sheats, and Jenny Hung; an application filed on May 4, 2001 and assigned application Ser. No. 09/849,190, and having issued on Aug. 10, 2004 as U.S. Pat. No. 6,775,680.

TYPE DESCRIPTOR METAMODEL by Shyh-Mei Ho, James Rhyne, Peter Elderon, Nick Tindall, and Tony Tsai; a pending application filed on May 4, 2001 and assigned application Ser. No. 09/849,377.

IMS TRANSACTION MESSAGES METAMODEL by Shyh-Mei Ho and Shahaf Abileah; a pending application filed on May 4, 2001 and assigned application Ser. No. 09/849,816.

IMS-MFS (MESSAGE FORMAT SERVICE) METAMODEL by Shyh-Mei Ho, Benjamin Sheats, Elvis Halcrombe, and Chenhuei J. Chiang; a pending application filed on May 4, 2001 and assigned application Ser. No. 09/849,105.

CICS-BMS (BASIC MESSAGE SERVICE) METAMODEL by Shyh-Mei Ho, Andy Krasun, and Benjamin Sheats; a pending application filed on May 4, 2001 and assigned application Ser. No. 09/849,793.

FIELD OF THE INVENTION

The invention relates to exchanging instructions and/or data between applications to signal readiness to transfer, exchange, or process data, or to establish at least one or more parameters for transferring data between the applications, and controlling the parameters in order to facilitate data transfer and communication. The invention further relates to integrating dissimilar applications one executing within one platform and another executing in another platform, e.g., multiple computers, multiple operating systems, multiple application components, multiple development environments, multiple deployment environments, or multiple testing and processing, establishing a dialog (e.g., a negotiation) with one another in order to establish connectivity for transferring data and/or instructions between the applications so as to facilitate performing tasks on the data or portions thereof to accomplish an overall goal. The parameters may include one or more of format, data types, data structures, or commands.

BACKGROUND

The growth of e-business has created a significant need to integrate legacy applications and bring them to the Internet This is because the current trend for new applications is to embrace Web standards that simplify end user application construction and scalability. Moreover, as new applications are created, it is crucial to seamlessly integrate them with existing systems while facilitating the introduction of new business processes and paradigms.

Integrating new applications with existing applications is especially critical since industry analysts estimate that more than seventy percent of corporate data, including data highly relevant to e-commerce, lives on mainframe computers. Moreover, while many e-commerce transactions are initiated on Windows, Mac, and Linux end user platforms, using a variety of Web browsers, and go through Windows NT and Unix servers, they are ultimately completed on mainframe computers, running mainframe applications, and impacting data stored in mainframe databases.

There are e-business pressures to integrate server level applications and bring them to the Internet. However, there is no complete and easy mechanism to integrate or e-business enable the applications. Integration, whether through messaging, procedure calls, or database queries, is key to solving many of today's business problems.

Integrating legacy applications with new software is a difficult and expensive task due, in large part, to the need to customize each connection that ties together two disparate applications. There is no single mechanism to describe how one application may allow itself to be invoked by another.

One consequence is an e-commerce environment of multiple applications, developed by multiple development teams, running on different platforms, with different data types, data structures, commands, and command syntax's. This environment is stitched together with application program interfaces and connectors. Connectors are an essential part of the total application framework for e-commerce. Connectors match interface requirements of disparate applications and map between disparate interfaces.

This growing interconnection of old and new software systems and applications, has led to various middle ware applications and connector applications, interface specifications, interface definitions, and code, especially for the interconnection and interaction of markup languages (such as HTML, XML, Dynamic HTML, WML, and the like), through object oriented languages such as SmallTalk and C++, with languages of legacy application server applications (such as COBOL). These interface specifications, definitions, and code should apply across languages, tools, applications, operating systems, and networks so that an end user experiences the look, feel, and responses of a single, seamless application at her terminal. Instead, the proliferation of standards, protocols, specifications, definitions, and code, e.g., Common Object Request Broker (CORBA), Common Object Model (COM), Object Linking and Embedding (OLE), SOM, ORB Plus, Object Broker, Orbix, has instead created an e-commerce "Tower of Babel."

Examples of application integration are ubiquitous: from installing an ERP system, to updating an Operational Data Store (ODS) with IMS transactions or invoking CRM systems from MQSeries; each of these requires the same basic steps. First, a user must find the entity she wants to communicate with, then she must figure out how to invoke the entity, and finally she must provide translation from one native representation to another. Today, these steps usually require manual investigation and hand coding—and leave the developers with a rat's-nest of hard-to-maintain connections between applications.

Attempts to remedy this situation involve application program interfaces and connectors, which are frequently built on Interface Definition Languages. Interface Definition Languages are declarative, defining application program interfaces, and, in some cases, issues such as error handling. Most Interface Definition Languages are a subset of C++, and specify a component's attributes, the parent classes that it inherits from, the exceptions that it raises, the typed events that it emits, the methods its interface supports, input and output parameters, and data types. The goal of Interface Definition Languages within connectors is to enable collaboration between dissimilar applications without hard coded application program interfaces.

Ideally, the interface definition language, and the connector of which it is a part, should facilitate full run-time software application collaboration through such features as
- Method invocation with strong type checking,
- Run-time method invocation with greater flexibility and run time binding,
- High level language binding, with the interface separated from the implementation.
- An interface repository containing real time information of server functions and parameters.

Additionally, the connector and its interface definition language, should be fast, efficient, scalable, portable, support metaclasses, support syntactic level extensions, and support semantic level extensions.

SUMMARY OF THE INVENTION

The problems associated with integrating new applications, for example, e-commerce applications, with legacy applications are obviated by the Common Application Metamodel tool, method, and system described herein. The Common Application Metamodel method, tool, and system of the invention facilitate tooling solutions, data translation, and communication and collaboration between dissimilar and disparate applications, as well as full run-time software application collaboration through an interface with the application server interface domain. This is accomplished through metadata interchange information, method invocation with strong type checking, run-time method invocation, run time binding, and high level language binding, with the interface separated from the implementation, and an interface repository containing real time information of client and server interface parameters.

Additionally, the tool, method, and system of the invention provide fast, efficient, and scalable interconnectivity independently of any tool or middleware, are reusable and portable, and support metaclasses, syntactic level extensions, and semantic level extensions, and are independent of any particular tool or middleware.

The Common Application Metamodel tool, method, and system is especially useful for providing a data transformer that is bidirectional between a client application and a server application, transmitting commands and data both ways between, for example, a Java, HTML, XML, C, or C++ application and a COBOL application.

One embodiment of the invention is a method of processing a transaction on or between an end user application and one or more application servers. The method comprises the steps of initiating the transaction on the end user application in a first language with a first application program, transmitting the transaction to the server, and converting the transaction from the first language of the first end user application to a language running on the application server. Typically, as described above, the client will be a thin client or a Web browser, the application running on the client will be a Web browser application or a thin client connectivity application, and the language of the client application will be Java, C, C++, or a markup language, as HTML or a derivative of HTML, such as XML or Dynamic HTML or WML, or the like, and the language running on the server is COBOL. The invention facilitates transformers which convert the transaction from the first language of the end user application to a language running on the application server. After conversion, the converted transaction is processed on the application server.

The application processes the request and then sends the response from the application server back to the end user application. Typically, as described above, the application server will be running a COBOL based application, and the client will be a thin client written in Java or C or C++, or a Web browser, running a Web browser application or a thin client connectivity application, in a markup language, as HTML or a derivative of HTML, such as XML or Dynamic HTML, or the like. The invention provides data transformers which convert the response from the language or languages running on the application server or servers to the first language of the first end user application.

The end user application and the application server have at least one data transformer between them. In this way, the steps of (i) converting the request from the first language of the first end user application as a source language to the COBOL language running on an application server as a target language, and (ii) converting the response from the COBOL language running on the application server, as a subsequent source language, back to the first language of the first end user application, as a subsequent target language, each comprise the steps of invoking type descriptor and language metamodels of respective source and target languages, populating the metamodels with each of the respective source and target languages' data items and types, and converting the source language to the target language.

The end user application is, frequently, a web browser or a thin client. When the end user application is a Web browser, the end user is connected to the application server through a web server. According to a further embodiment of the invention, the web server may comprise the connector, or data transformer. The data transformer integrated with the Web server may directly convert the request, transaction, or message from a browser oriented form to an application server language or to an intermediate, business or commerce oriented markup language, such as XML.

The CAM metamodel used to construct the converter comprises an invocation metamodel, an application domain interface metamodel, a language metamodel, and a type descriptor metamodel. Exemplary invocation metamodel includes information chosen from the group consisting of message control information, security data, transactional semantics, trace and debug information, pre-condition and post-condition resources, and user data, etc. Exemplary application domain interface metamodel comprises information chosen from input parameter signatures, output parameter signatures, and return types. Application domain interface metamodel uses one or more language metamodels, such as COBOL metamodels.

The type descriptor metamodel defines physical realizations, storage mapping, data types, data structures, and realization constraints.

The method of the invention is applicable to situations where one of the source or target languages is object oriented, and the other of the target or source languages is not object oriented. In this situation, the language metamodel and the type descriptor metamodel together map encapsulated objects of the object oriented language into code and data of the language that is not object oriented. Additionally, the language metamodel and the type descriptor metamodel maps object inheritances of the object oriented language into references and pointers in the language that is not object oriented. The method of the invention is also applicable where different procedural languages are running on different platforms or applications and commands and data of the source procedural language are mapped into the target procedural language.

According to the method of the invention, there may be a plurality of applications for vertical (sequential, conditional, or dependent) processing, for horizontal (parallel in time) processing, or both horizontal and vertical processing. This is to support rich transactions to and through multiple hierarchical levels and multiple parallel sequences of processing. This may be the case in business to business transactions drawing upon financial, manufacturing, scheduling, supply, and shipping databases and servers, and utilizing various commercial security instruments.

A further aspect of the invention is a client-server processing system having a client, a server, and at least one transformer between the client and one or more servers.

A still further aspect of the invention is a processing system configured and controlled to interact with a client application. In this aspect of the invention, the system comprises, a server, and at least one transformer between the server and the client application, where the client has an end user application, and is controlled and configured to initiate a request with the server in a first language with a first application program and to transmit the request through a transformer to the server or servers. The server processes the request in a second software application, using a second language, and returns a response to the client through a transformer.

A further aspect of the invention is a groupware system having a plurality of e-mail enabled end user applications, such as e-mail, word processing, spreadsheet, simple database management (such as Lotus Approach or Microsoft Access), graphics and graphics editing, audio and audio editing, and computer-telephony integration ("CTI"), along with client level content database client services and content replication client services. Groupware integrates these e-mail enabled applications through one or more transformers and application program interfaces with transport services, directory services, and storage services, including content servers and replication servers. The groupware system is configured and controlled to communicate among disparate end user applications, among disparate servers, and between disparate servers and end user applications. The groupware system comprises at least one transformer between a server and an end user application. The end user application is controlled and configured to participate with a server in a first language of a first application program and the server is configured and controlled to participate with the client in a second language of a second program.

The transformer is configured and controlled to receive a request from the end user application, and convert the request from the first language of the first end user application to a language running on the server. The server is configured and controlled to receive the converted request from the transformer and process the request in a second language with a second application program residing on the server, and to thereafter transmit a response through a transformer back to the end user application.

A still further embodiment of the invention is the provision of rich transaction processing. Rich transactions are nested transactions that span to, through, and/or across multiple servers. The spanning across nested servers may be horizontal, that is parallel dependent transactions, or vertical, that is, serial dependent transactions. Rich transactions may be long lived, on-going transactions, or complex business-to-business transactions, especially those with multiple dependencies or contingencies, volume and prompt payment discounts, late delivery and late payment penalties, and with financial processing, such as electronic letters of credit, electronic bills of lading, electronic payment guarantees, electronic payment, escrow, security interests in the goods, and the like. In a rich transaction environment, some transaction servers may be positioned as clients with respect to other transactions for certain sub transactions making up the rich transaction.

A still further embodiment of the invention is a tool, that is, a software developer's kit, characterized in that the program product is a storage medium (as a tape, floppy disks, a CD-ROM, or a hard drive or hard drives on one of more computers) having invocation metamodels, application domain interface metamodels, and language metamodels, and computer instructions for building a metamodel repository of source and target language metamodels. The program product also contains computer instructions for building connector stubs from the metamodels. The program product further carries computer instructions to build a transformer.

While the invention has been described in summary form as having a single level of connectors, it is, of course, to be understood that such connectors may be present at various levels in the processing hierarchy, for example between Web Clients and Web servers, between web servers and application servers, between application servers and database servers, and between application servers or database servers or both and various specialized repositories.

It is also to be understood, that while the invention has been summarized in terms of individual clients and individual servers, there may be multiple clients, multiple servers, and applications that function as both clients and servers, as exemplified by groupware applications, and there might be multiple parallel lines and/or multiple hierarchical levels of application servers, data servers, and databases, as in systems for rich transactions.

THE FIGURES

Various elements of the invention are illustrated in the FIGURES appended hereto.

Figure 5:
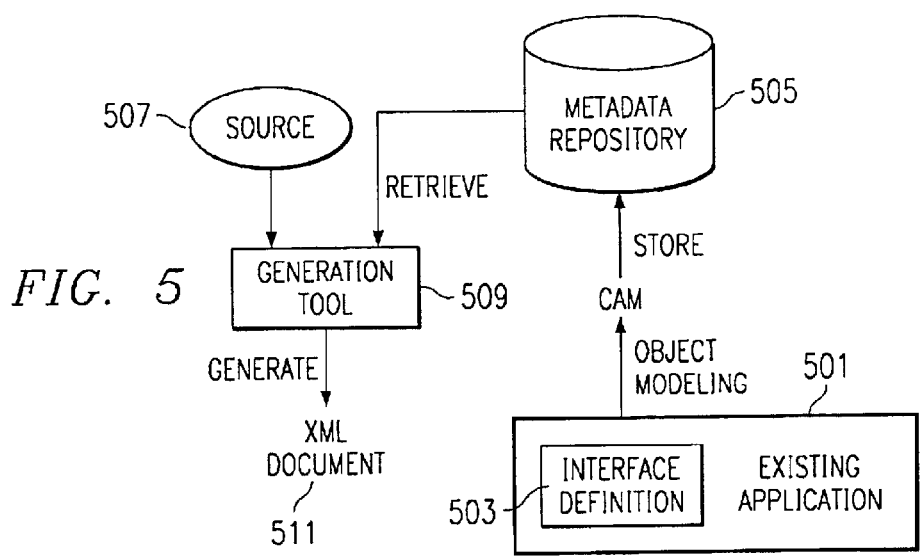

FIG. 5 illustrates how a tool can be used to generate an XML document describing application program interface. First, an object model, i.e., a CAM metamodel, is created to capture interface definitions about an application server. Then a tool reads and parses the source definitions of an application program and generates an XML document by retrieving the object model's information from a repository.

Figure 6:
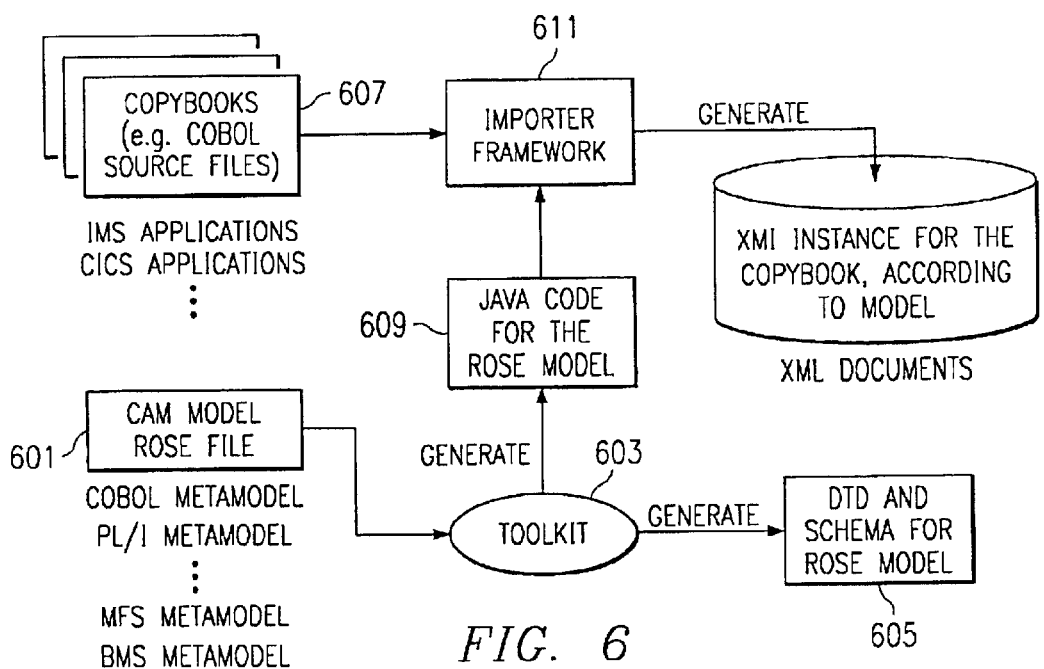

FIG. 6 illustrates a development phase scenario where a Common Application Metamodel Rose file, e.g., a COBOL metamodel, a PL/I metamodel, an MFS metamodel, a BMS model, or the like is read into a toolkit, to generate a DTD and XML schema and Java code for a Rose model. A source file of an application, as a COBOL source file, a PL/I source file, an MFS source file, a BMS source file, or the like, is read into an importer. The importer parses the source code and generates, as output, an XMI instance file, i.e., XML documents, by reading in the Java code of the Rose model of the application source files.

Figure 7:
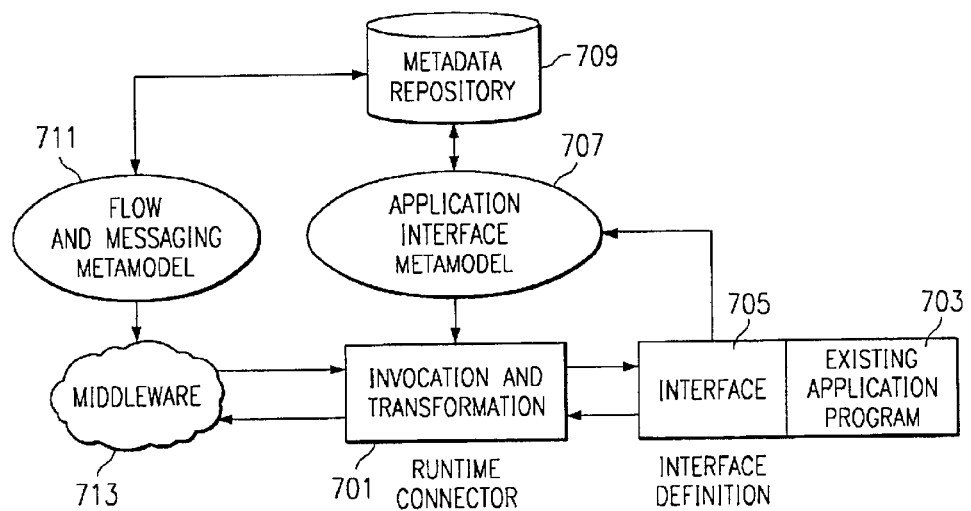

FIG. 7 illustrates a metamodel for application interfaces, which enables integration of application components into an event based messaging model, including flow models. The flow and messaging middle invokes applications through the application interface. These interfaces are access points to the applications through which all input and output is connected to the middleware. The interfaces are described in terms of the Application Interface Metamodels. Transformation processing according to he metamodel could take place in source/client applications, target applications, or a gateway.

Figure 8:
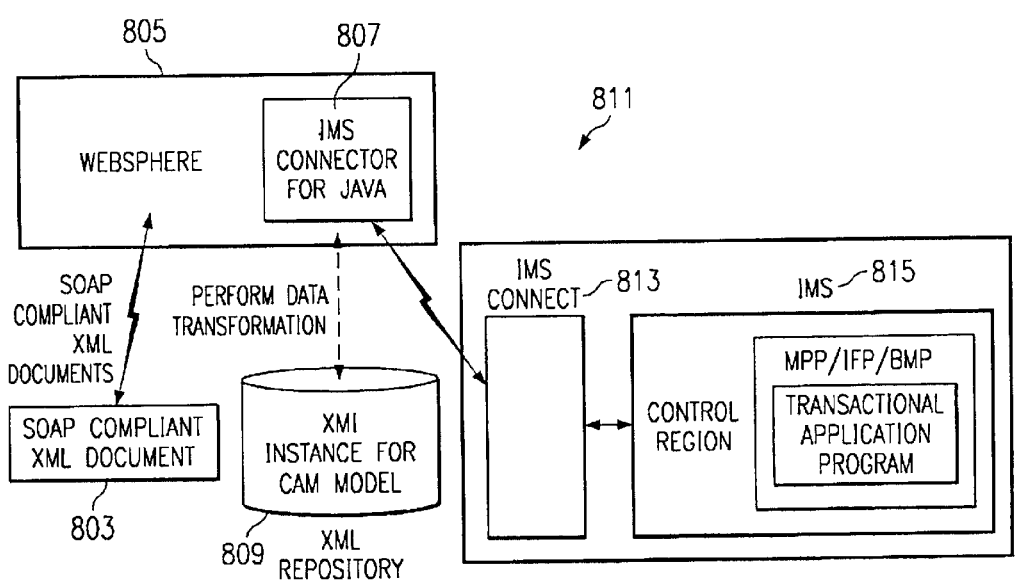

FIG. 8 illustrates the application of the Common Application Metamodel during execution time. As shown, the CAM model facilitates connectivity between a back-end IMS application and a Web file (e.g., SOAP complaint XML documents). This is accomplished by using information captured in the model to perform data transformations from one platform to another in a mixed language environment shown.

Figure 9:
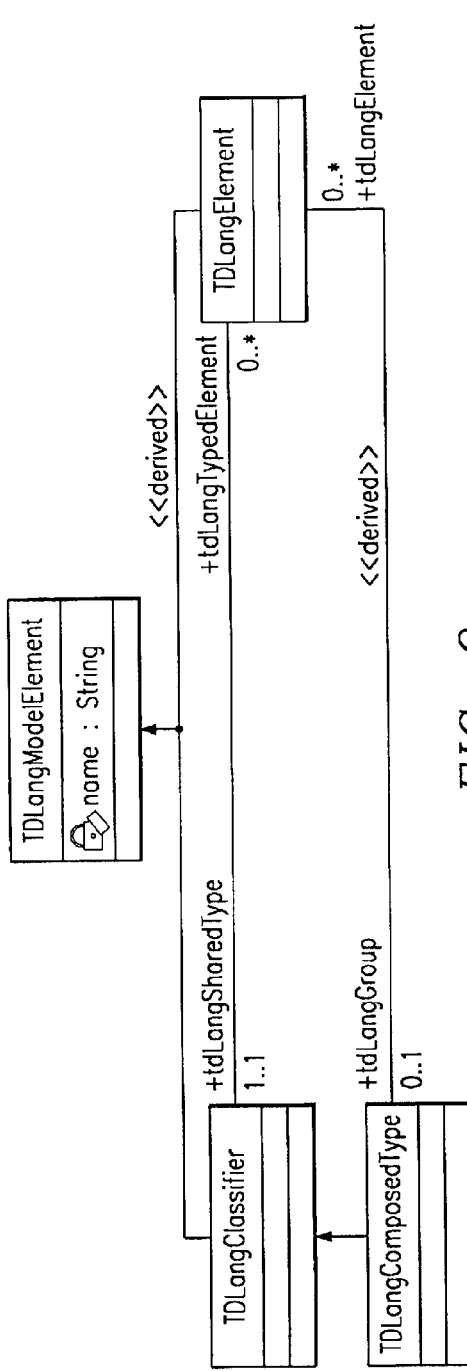

FIG. 9 illustrates TDLang base classes, where the Type Descriptor metamodel is used as a recipe or template for runtime data transformation, with the language specific metamodel for overall data structures and field names, and without duplicating the aggregation associations present in the language model.

Figure 10A:
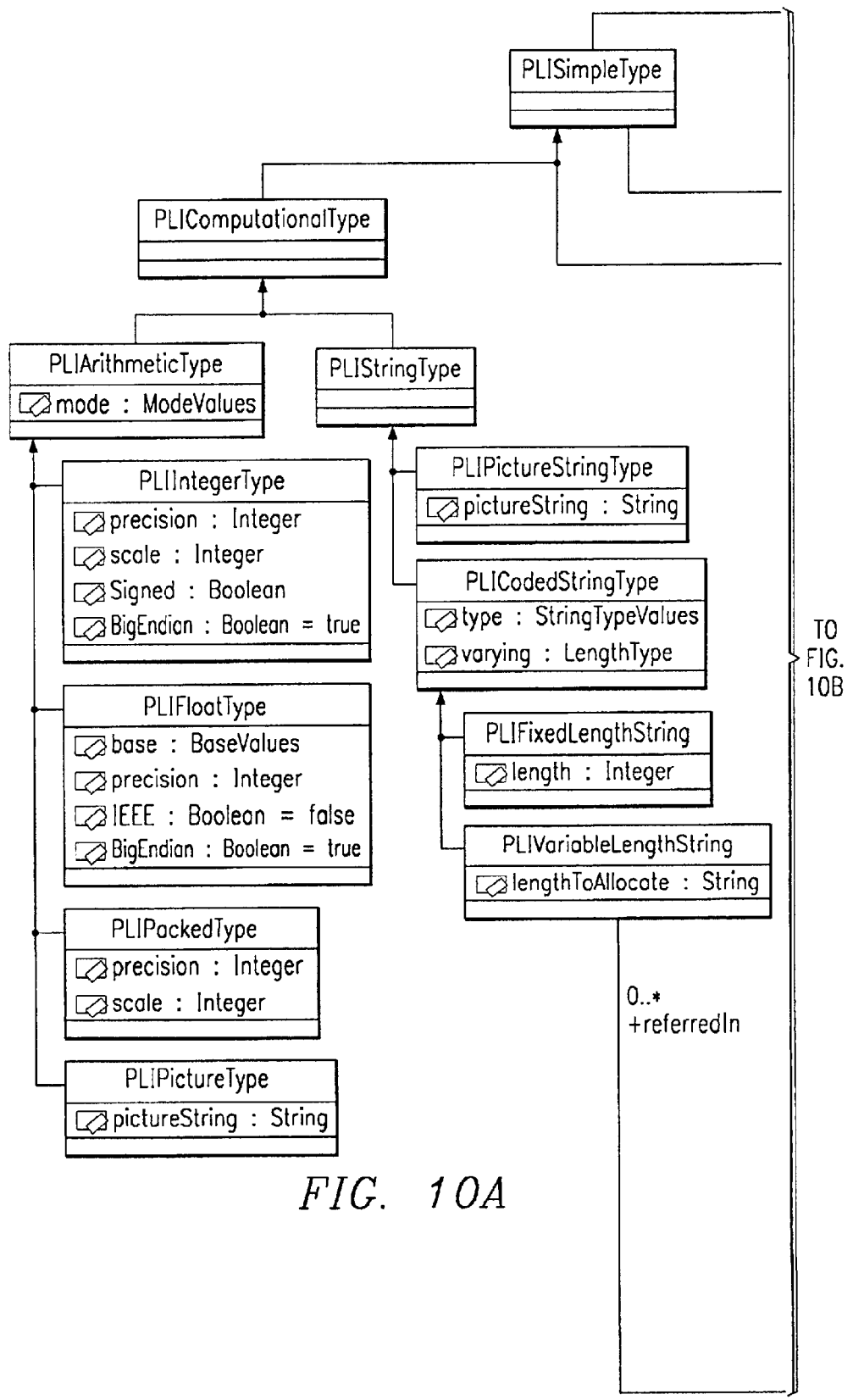
Figure 10B:
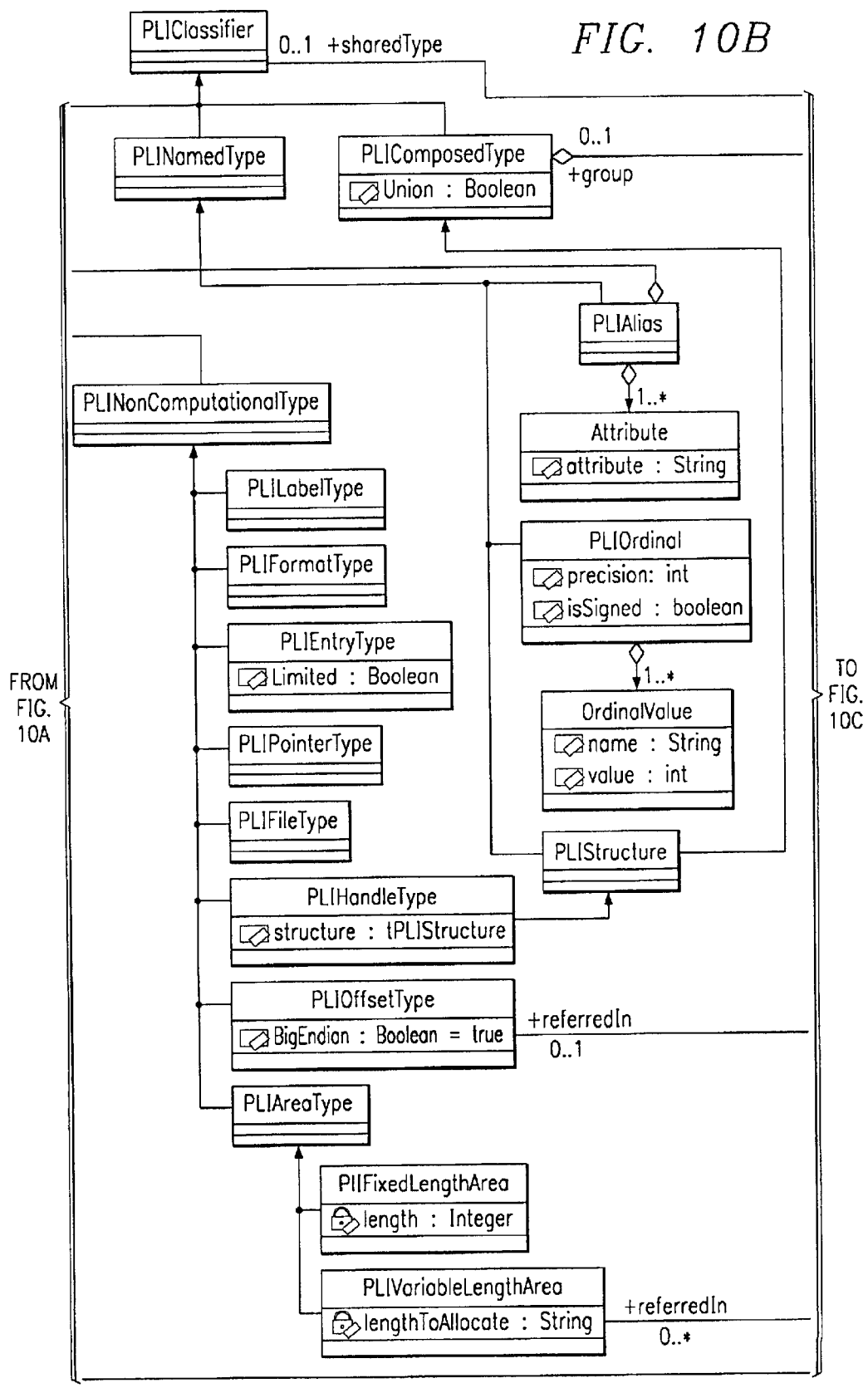
Figure 10C:
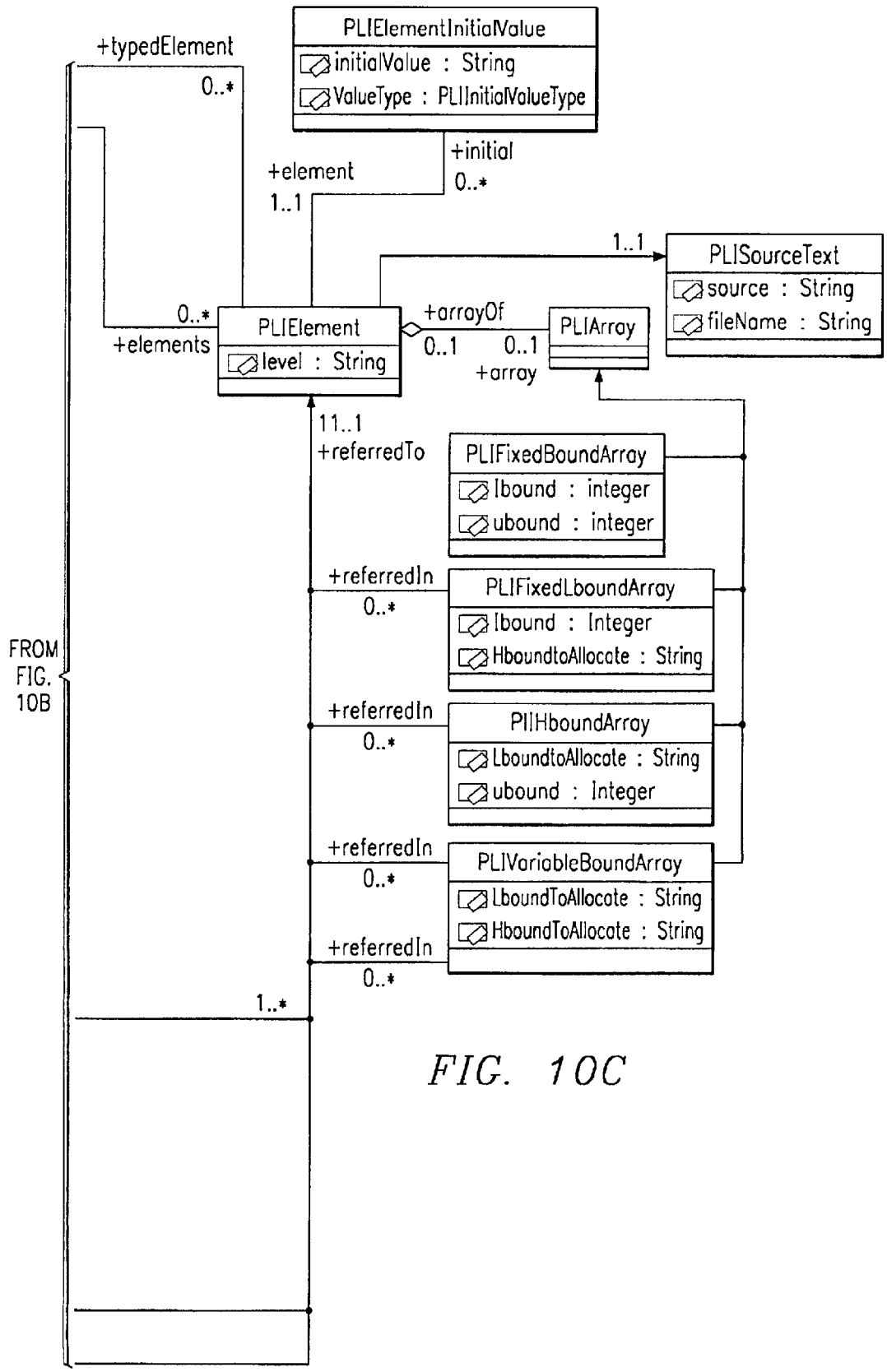

FIG. 10 illustrates an MOF class instance at the M2 level as a Type Descriptor Metamodel.

Figure 11:
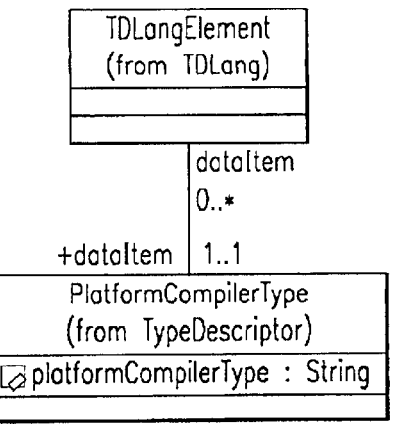

FIG. 11 illustrates the association between a TDLangElement of the TDLang Metamodel with a Platform Compiler Type of the Type Descriptor Metamodel.

FIG. 12 illustrates various enumeration types for the Type Descriptor Metamodel, e.g., sign coding, length encoding, floating type, accessor, packed decimal sign, and bitModelPad.

Figure 13A:
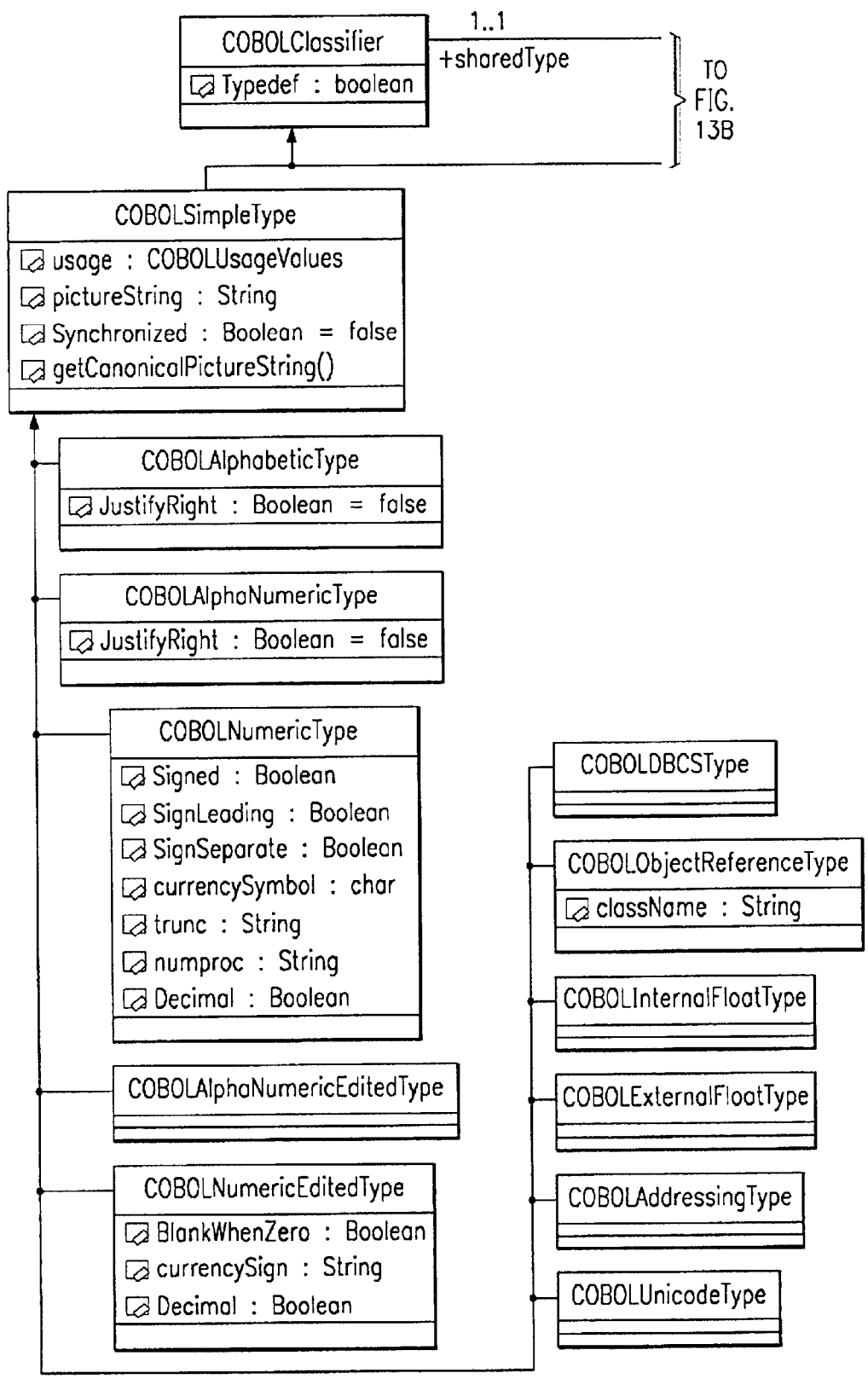
Figure 13B:
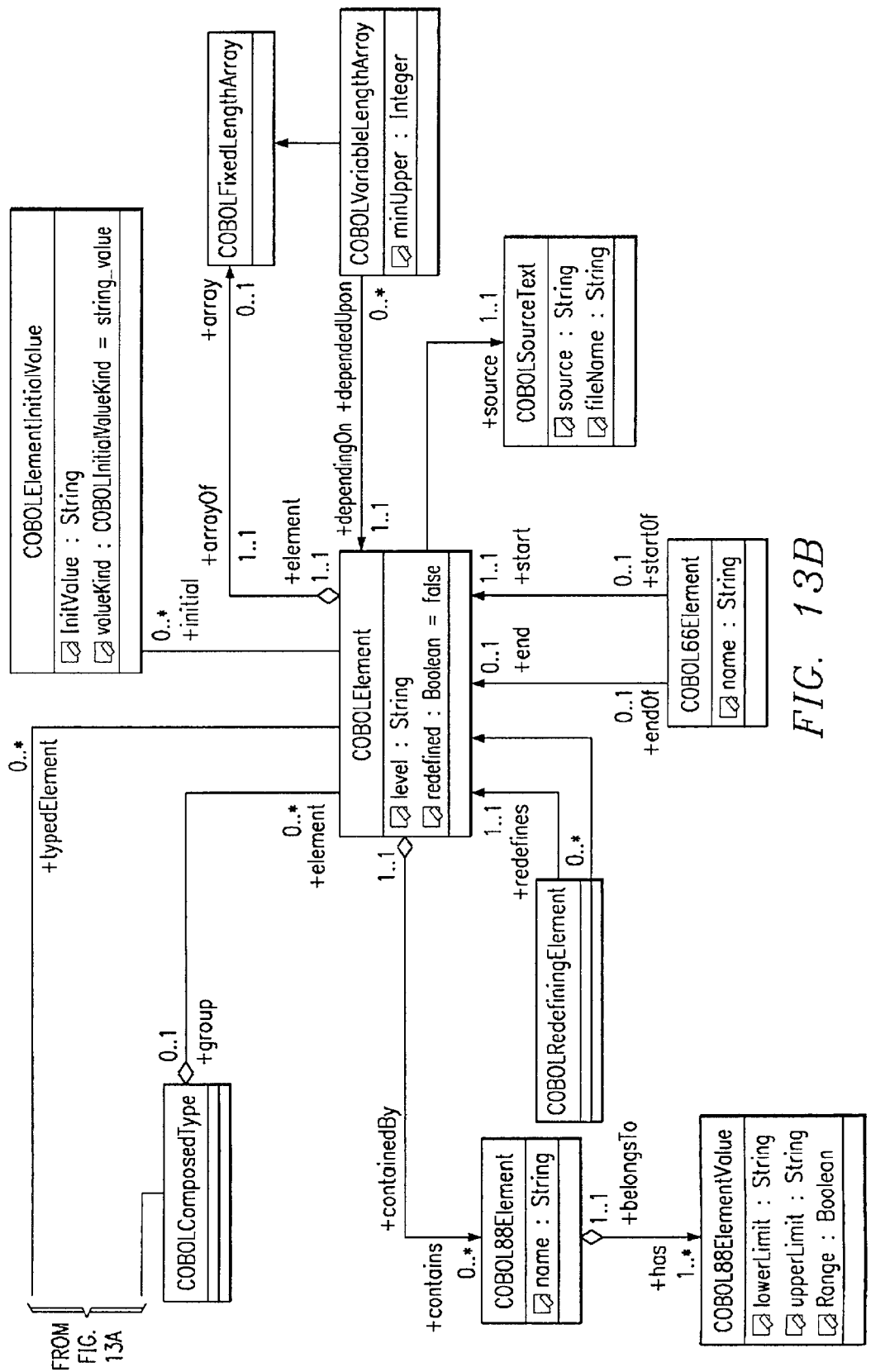

FIG. 13 illustrates a COBOL metamodel to define data structure semantics which represent connector interfaces. This metamodel is also a MOF Class instance at the M2 level.

Figure 14:
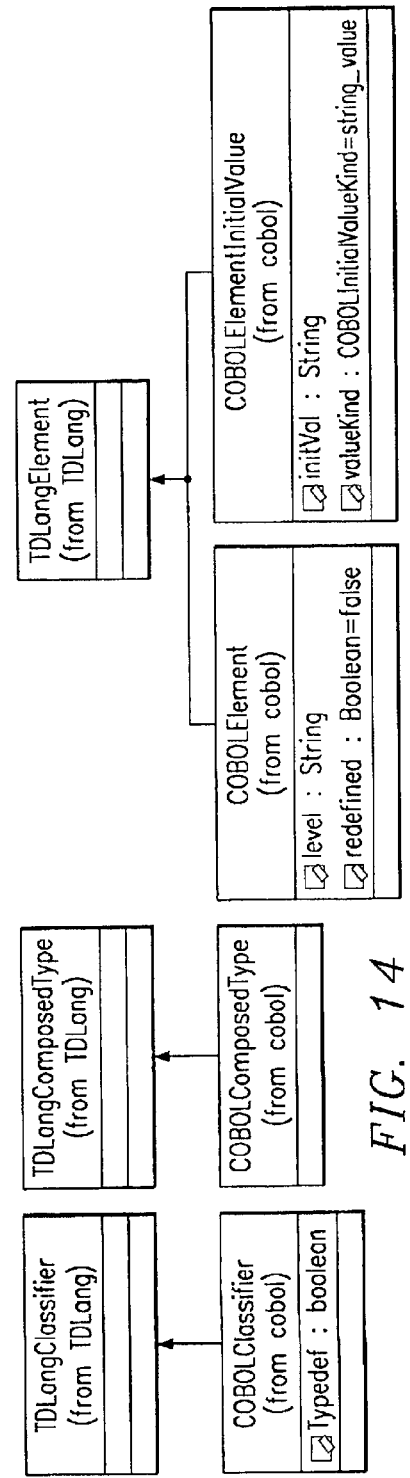

FIG. 14 illustrates the associations between the COBOL metamodel with the TDLang base classes which are the TDLangClassifier, the TDLanguageComposedType, and the TDLangElement.

Figure 15:
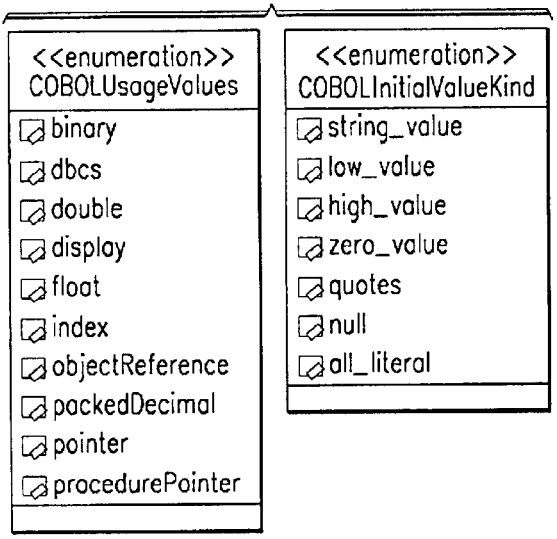

FIG. 15 illustrates an enumeration of the COBOL usage values in the COBOL Metamodel.

Figure 16:
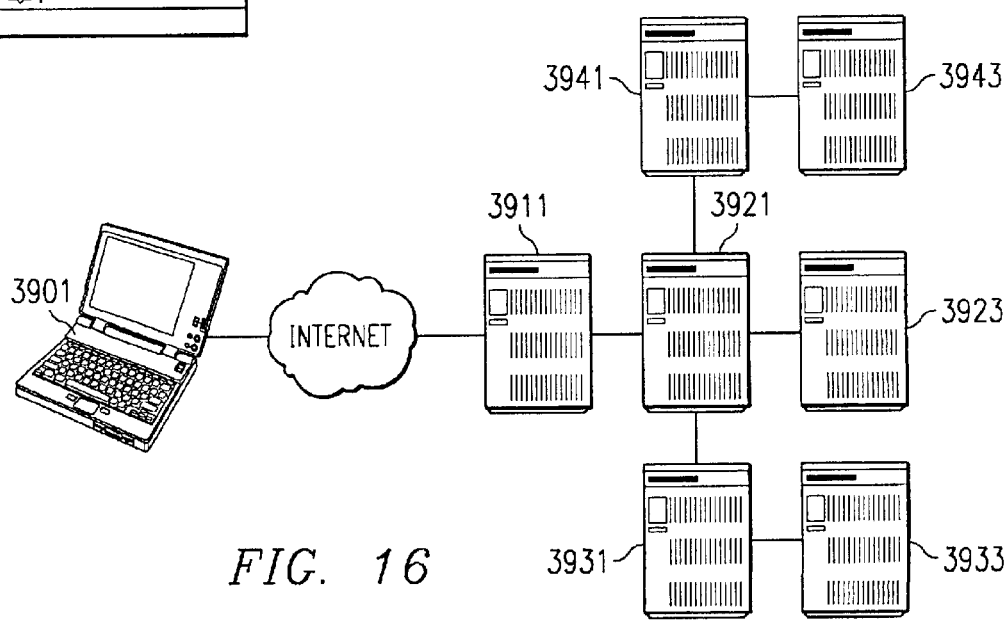

FIG. 16 illustrates a simplified network configuration for a "rich" transaction where, for example, an order is entered at a terminal, and is passed to and through a Web server to a manufacturer's application server. The manufacturer's application server searches through it's own database server, as well as its vendors' dissimilar and incompatible database servers and databases, transparently connected by the connectors described herein, querying for statuses, prices, and delivery dates, of components, and placing orders for needed components to satisfy the order.

Figure 17:
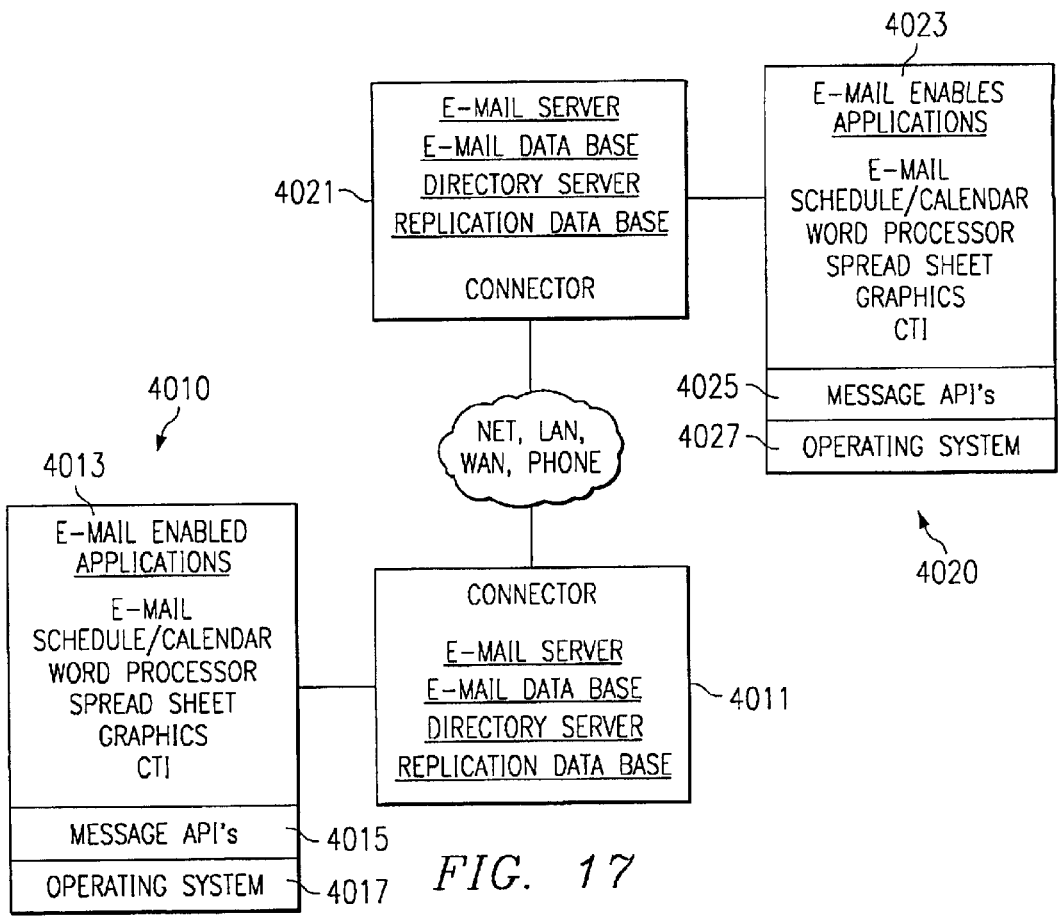

FIG. 17 illustrates a group ware session spread across multiple group ware applications running on multiple, disparate platforms, and connected using the common application metamodel described herein.

Figure 18:
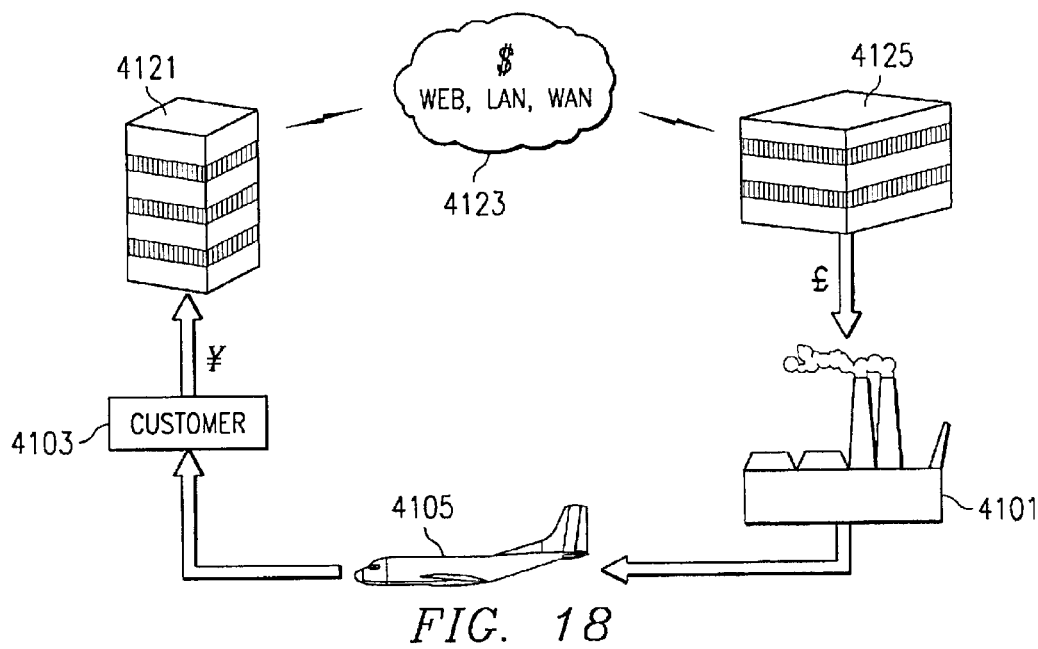

FIG. 18 illustrates a commercial transaction where real goods are shipped from a seller to a buyer, and various forms of electronic payment and secured electronic payment are used by the buyer to pay the seller, with banks and financial institutions connected using the common application metamodel described herein.

DETAILED DESCRIPTION OF THE INVENTION

Definitions. As used herein the following terms have the indicated meanings. "Handshaking" is the exchange of information between two applications and the resulting agreement about which languages, capabilities, and protocols to use that precedes each connection.

An "application program interface" (API) is a passive specific method prescribed by a computer operating system or by another application program by which a programmer writing an application program can make requests of the operating system or another application. Exemplary is SAX (Simple API for XML), an connector that allows a programmer to interpret a Web file that uses the Extensible Markup Language, that is, a Web file that describes a collection of data. SAX is an event-driven interface. The programmer specifies an event that may happen and, if it does, SAX gets control and handles the situation. SAX works directly with an XML parser.

A "connector" as used herein is a dynamic, run-time, interface between platforms that stores the functions and parameters of the target platform or program, and binds with the target platform program in real time.

A "stub" is a small program routine that provides static interfaces to servers. Precompiled stubs define how clients invoke corresponding services on the server. The stub substitutes for a longer program on the server, and acts as a local call or a local proxy for the server object. The stub accepts the request and then forwards it (through another program) to the remote procedure. When that procedure has completed its service, it returns the results or other status to the stub which passes it back to the program that made the request. Server services are defined in the stub using an Interface Definition Language ("IDL"). The client has an IDL stub for each server interface that it accesses and includes code to perform marshaling. Server stubs provide static interfaces to each service exported by the server.

"CICS" (Customer Information Control System) is the online transaction processing program from IBM that, together with the Common Business Oriented Language programming language, is a set of tools for building customer transaction applications in the world of large enterprise mainframe computing. Using the programming interface provided by CICS to write to customer and other records (orders, inventory figures, customer data, and so forth) in a CICS, a programmer can write programs that communicate with online users and read from a database (usually referred to as "data sets") using CICS facilities rather than IBM's access methods directly. CICS ensures that transactions are completed and, if not, it can undo partly completed transactions so that the integrity of data records is maintained. CICS products are provided for OS/390, UNIX, and Intel PC operating systems. CICS also allows end users to use IBM's Transaction Server to handle e-business transactions from Internet users and forward these to a mainframe server that accesses an existing CICS order and inventory database.

"IMS" (Information Management System) is the system from IBM that, together with IBM's Enterprise Systems Architecture (IMS/ESA) provides a transaction manager and a hierarchical database server.

"MQ" is the MQSeries IBM software family whose components are used to tie together other software applications so that they can work together. This type of application is often known as business integration software or middleware. Functionally, MQSeries provides a communication mechanism between applications on different platforms, an integrator which centralizes and applies business operations rules, and a workflow manager which enables the capture, visualization, and automation of business processes. MQSeries connects different computer systems, at diverse geographical locations, using dissimilar IT infrastructures, so that a seamless operation can be run. IBM's MQSeries supplies communications between applications, and between users and a set of applications on dissimilar systems. Additionally, MQSeries' messaging scheme requires the application that receives a message to confirm receipt. If no confirmation materializes, the message is resent by the MQSeries.

"Rose" is an object-oriented Unified Modeling Language (UML) software design tool intended for visual modeling and component construction of enterprise-level software applications. It enables a software designer to visually create (model) the framework for an application by blocking out classes with actors (stick figures), use case elements (ovals), objects (rectangles) and messages/relationships (arrows) in a sequence diagram using drag-and-drop symbols. Rose documents the diagram as it is being constructed and then generates code in the designer's choice of C++, Visual Basic, Java, Oracle8, Corba or Data Definition Language.

Figure 1:
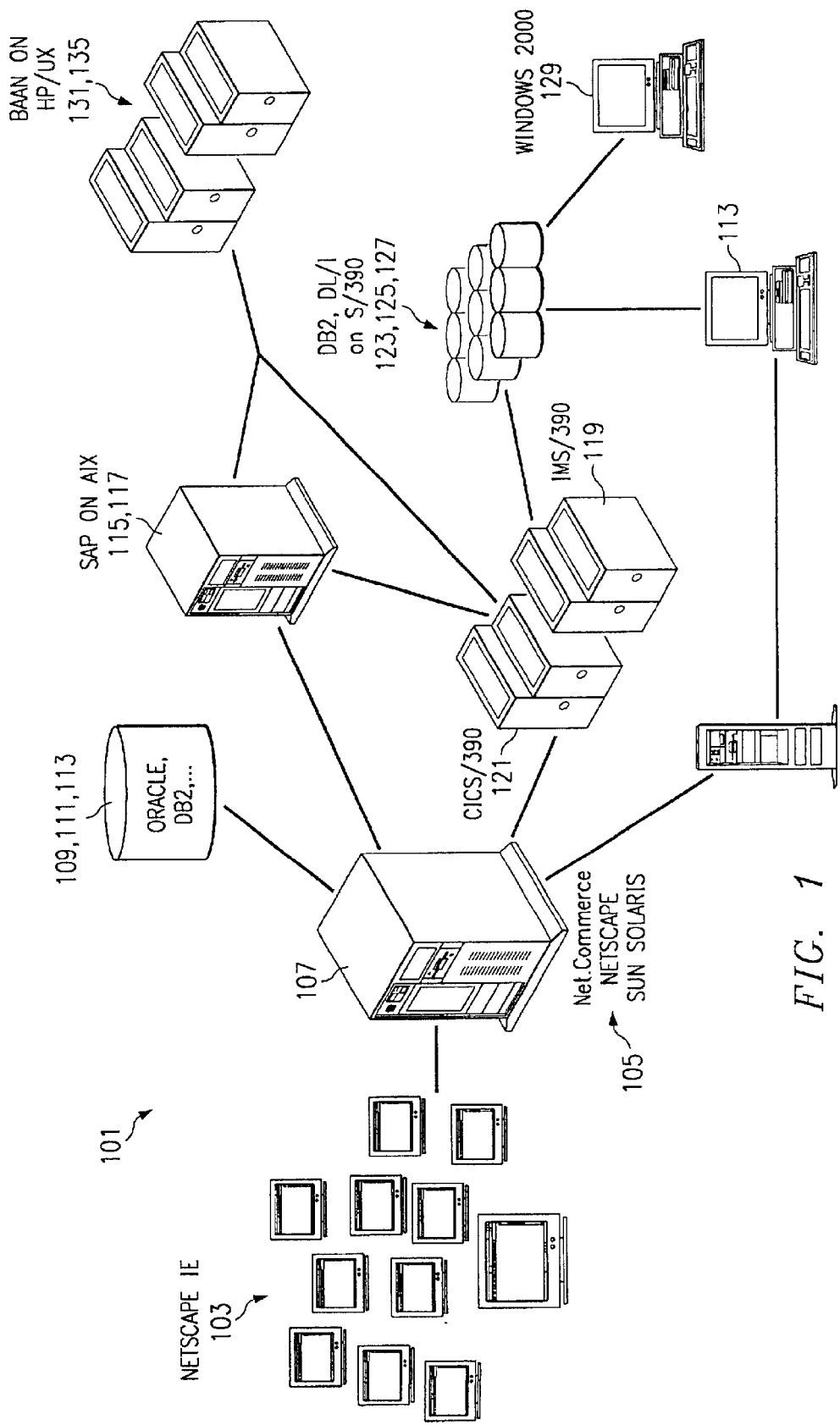
FIG. 1 illustrates a system with multiple application components, including a Netscape Internet Explorer browser, Net.Commerce on a Sun Solaris server, Oracle and DB2 on a database server, SAP running on AIX, a CICS 390 server, an IMS 390 server, DB2 and DL/I on a S/390 platform, a Windows 200 client, and Baan running on an HP Unix server.
Figure 2:
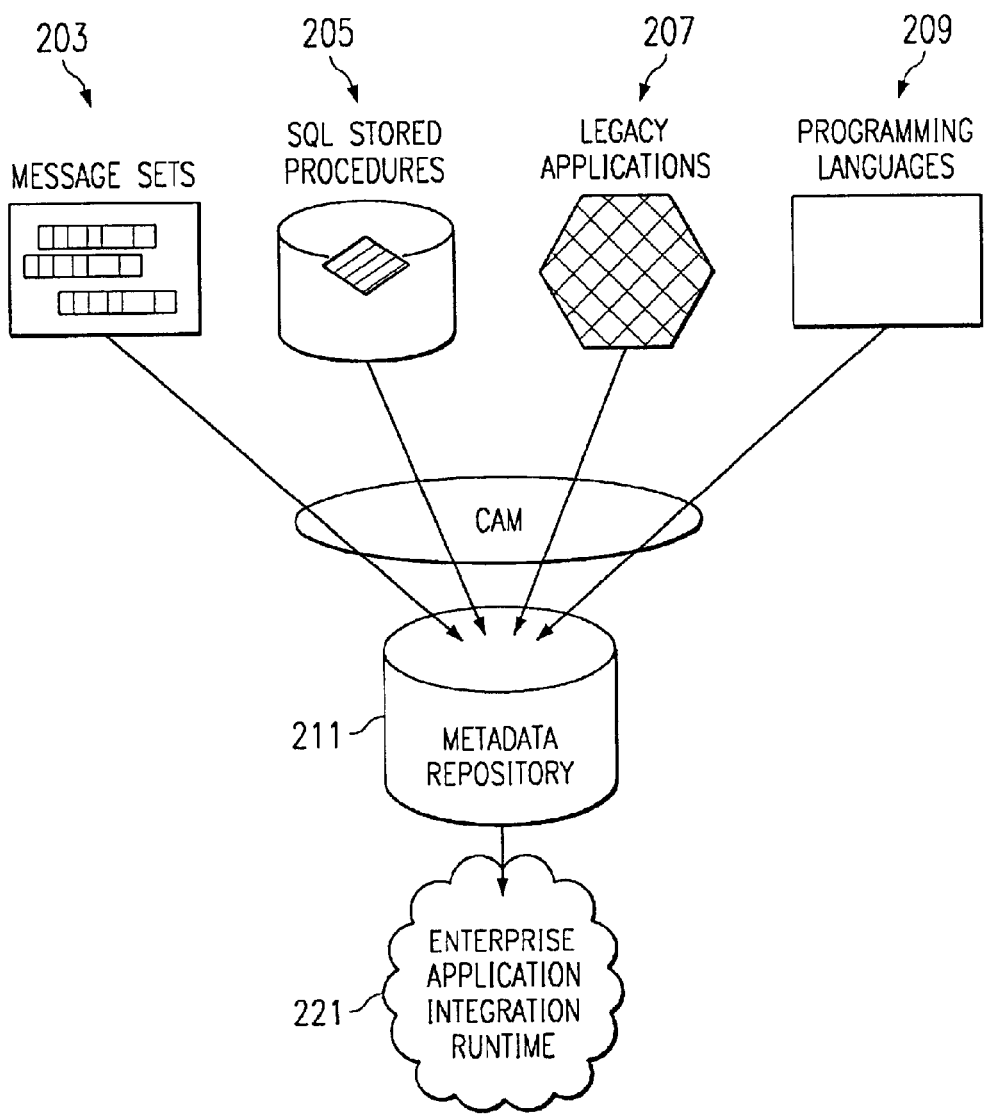
FIG. 2 illustrates the roles of message sets, SQL stored procedures, legacy applications, and programming languages as inputs to the metadata repository of the Common Application Metamodel to facilitate enterprise application integration at run time.

Common Application Metamodel Overview. The Common Application Metamodel (CAM) brings interconnectivity to the environment illustrated in FIG. 1. FIG. 1 illustrates a typical system 101 with multiple application components, including a Netscape Internet Explorer browser 103, Net.Commerce 105 on a Sun Solaris server 107, Oracle 109 and DB2 111 on a database server 113, SAP 115 running on AIX 117, a CICS 390 server 119, an IMS 390 server 121, DB2 123 and DL/I 125 on a S/390 platform 127, a Windows 2000 client 129, and Baan 131 running on an HP Unix server 133. The Common Application Metamodel (CAM) is metadata interchange method, tool, and system for marshaling and applying information needed for accessing enterprise applications, such as in FIG. 1, in a source language and converting them to a target language. CAM consists of language metamodels and application domain interface metamodels, as shown in FIG. 2, which illustrates the roles of message sets 203, SQL stored procedures 205, legacy applications 207, and programming languages 209 as inputs to the metadata repository 211 of the Common Application Metamodel to facilitate enterprise application integration 221.

Figure 3:
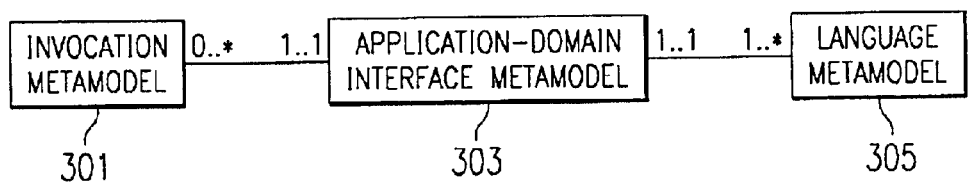
FIG. 3 illustrates that the Common Application Metamodel of the invention consists of three kinds of metamodels, i.e., an invocation metamodel, an application-domain interface metamodel, and a language metamodel. For any given application-domain metamodel it may use one or many language metamodels, and there could be zero or many invocation metamodels.

Exemplary metamodels include C, C++, Java, COBOL, PL/I, HL Assembler, IMS transaction messages, IMS MFS, CICS BMS, and MQSeries messages models, as shown in FIG. 3, which illustrates the Common Application Metamodel of the invention, with an invocation metamodel 301, an application-domain interface metamodel 303, and a language metamodel 305.

Figure 4:
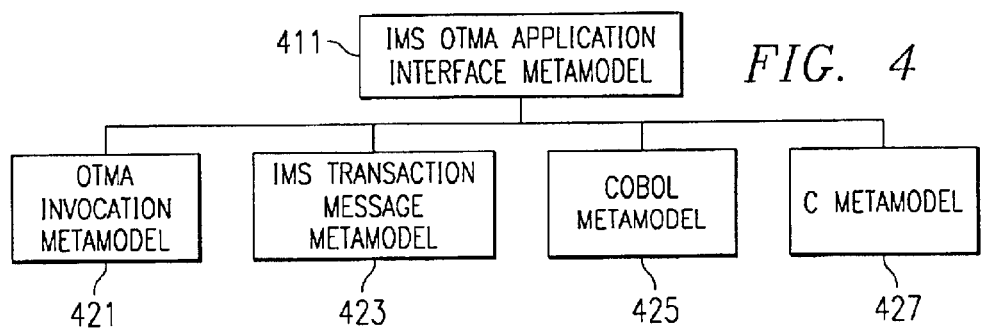
FIG. 4 illustrates an IMS OTMA metamodel, with an OTMA Invocation Metamodel, an IMS Transaction Message Metamodel application interface, which could use a COBOL Metamodel, a C Metamodel, or other language metamodels.

FIG. 4 illustrates an IMS OTMA application interface metamodel 411, with an OTMA Invocation Metamodel 421, an IMS Transaction Message Metamodel 423, a COBOL Metamodel 425, and a C Metamodel 427.

FIG. 5 illustrates the flow of information from an existing application 501, through an interface 503 to an object model containing application interface metadata. This application interface metamodel is stored in the metadata repository 505, and, at an appropriate time, retrieved from the metadata repository 505, combined with a source program 507 in a generation tool 509, and used to generate a target file 511, as an XML file, i.e., an XMI instance file. CAM is highly reusable and independent of any particular tool or middleware.

Development Stage. With CAM, tooling can now easily provide solutions to access enterprise applications, e.g. IMS applications. By parsing each source file and generating XML documents based on the CAM model, COBOL copybook, PL/I copybook, MFS Source, BMS Source, etc., tools can provide connector solutions to IMS, and CICS, etc.

In this regard, FIG. 6 illustrates a development phase scenario where a Common Application Metamodel Rose file 601, e.g., a COBOL metamodel, a PL/I metamodel, an MFS metamodel, a BMS model, or the like is read into a toolkit 603, to generate a DTD and schema for a Rose model and Java code for a Rose model 605. A source file of an application 607, as a COBOL source file, a PL/I source file, an MFS source file, a BMS source file, or the like, and the Java code for the Rose model 609 are read into an Importer 611. The importer parses the source code and provides, as output, an XMI instance file 613, i.e., XML documents, of the application source files.

FIG. 7 shows a CAM metamodel for application interfaces. This Figure depicts a runtime connector 701 with invocation and transformation capabilities, interfacing with an existing application program 703 through an interface 705 containing the existing application program's interface definition, in accordance with the application interface metamodel 707. The Application Interface metadata is stored in a metadata repository 709.

The flow and messaging middleware 713 invokes applications 703 through the application interfaces 705. These interfaces 705 are the access points to the applications 703 through which all input and output is connected to the middleware 713. The interfaces 705 are described in terms of the Application Interface Metamodel. Transformation processing according to the metamodel could take place in source/client applications, target applications, or a gateway.

Because CAM also provides physical representation of data types and storage mapping to support data transformation in an enterprise application integration environment, it enables Web services for enterprise applications.

At development time CAM captures information that facilitates:

a). connector and/or connector-builder tools,
b). data driven impact analysis for application productivity and quality assurance, and
c). viewing of programming language data declarations by developers.

The CAM metamodel files are inputs to toolkits used to generate DTD files, XML schemas, and Java classes which represent the CAM model. Importers parse each source file (e.g. COBOL or PL/I copybook, MFS source, and BMS, etc.), and then generate XML documents (i.e. XML instance files) based on Java classes generated by the XMI/MOF2 toolkit.

Run Time. At run time CAM provides information which facilitates transformation in an enterprise application integration environment where it provides data type mapping between mixed languages, facilitates data translations from one language and platform domain into another.

FIG. 8 illustrates the application of the Common Application Metamodel during run time. As shown, SOAP compliant XML documents 803 are received in, for example, IBM WebSphere middleware, 805, which contains an IMSConnector for Java 807, and is in contact with an XML Repository 809, containing the XMI instance files for the CAM model. The IBM WebSphere middleware sends the transformed file to the IMS system 811, which contains an instance of IMS Connect 813 and the IMS transactional application program 815. CAM facilitates connectivity between the back-end IMS application 815 and the Web file (e.g., SOAP compliant XML documents) 803. The CAM accomplishes this by using CAM model information (from repository 809) to perform data transformations from one platform to another in the mixed language environment shown.

Type Descriptor Metamodel. One important feature provided by CAM is the Type Descriptor metamodel. The Type Descriptor metamodel defines the physical realization, storage mapping, and the constraints on the realization (such as justification). This metamodel provides a physical representation of individual fields of a given data structure. When supporting data transformation in an enterprise application integration environment, the model provides data type mapping between mixed languages. It also facilitates data translations from one language and platform domain into another. The metamodel is used for runtime data transformation (or marshaling) with a language-specific metamodel for overall data structures and field names.

1. Common Application Metamodel for Application Interfaces

The interconnection of disparate and dissimilar applications running on different software platforms, as shown in FIG. 1, with different operating systems, physical platforms, and physical realizations is accomplished through connectors that incorporate the interconnection metadata. Connectors are a central part of the application framework for e-business. The end user demand is to connect to anything interesting as quickly, and as easily, as possible.

A connector is required to match the interface requirements of the adapter and the legacy application. It is also required to map between the two interfaces. Standardized metamodels for application interfaces presented herein allow reuse of information in multiple connector tools. These standardized metamodels not only reduce work to create a connector, but also reduce work needed to develop connector builder tools.

The connectors built using the common application metamodel of our invention provide interoperability with existing applications. The connectors support leveraging and reuse of data and business logic held within existing application systems. The job of a connector is to connect from one application system server "interface" to another. Therefore, an application-domain interface metamodel describes signatures for input and output parameters and return types for a given application system domain (e.g. IMS, MQSeries); it is not for a particular IMS or MQSeries application program. The metamodel contains both syntactic and semantic interface metadata.

1. a. End-to-End Connector Usage Using Common Application Metamodel

The Common Application Metamodel (CAM) consists of meta-definitions of message signatures, independent of any particular tool or middleware. Different connector builder tools can use this information to ensure the "handshaking" between these application programs, across different tools, languages, and middleware. For example, if you have to invoke a MQSeries application, you would need to build a MQ message using data from a GUI tool and deliver it using the MQ API. Similarly, when you receive a message from the MQSeries application, you would need to get the buffer from MQSeries, parse it and then put it into a GUI tool data structure. These functions can be designed and implemented efficiently by a connector builder tool using CAM as standardized metamodels for application interfaces.

CAM can be populated from many sources, including copy books, to generate HTML forms and JavaServer Page (JSP) for gathering inputs and returning outputs. An example of a connector as depicted in the previous figure is that the flow and message middleware makes a function call to an enterprise application by calling the connector which then calls the enterprise application API. The connector does language and data type mappings, for example, to translate between XML documents and COBOL input and output data structures based on CAM. Connectors and CAM provide the end-to-end integration between the middleware and the enterprise applications.

Using IMS as an example. Let's say that you must pass an account number to an IMS transaction application program from your desktop to withdraw $50.00. With CAM and a connector builder tool, you will first generate an input HTML form and an output JSP; and develop a middleware code necessary to support the request. The desktop application fills the request data structure (i.e. an input HTML form) with values and calls the middleware. The middleware service code will take the data from the GUI tool, build an IMS Connect XML-formatted message, and deliver the message to the IMS gateway (i.e. IMS Connect) via TCP/IP. IMS Connect translates between the XML documents and the MS message data structures in COBOL using the metadata definitions captured in CAM. It then in turn sends the IMS message data structures to IMS via Open Transaction Manager Access (OTMA). The IMS COBOL application program runs, and returns the output message back to the middleware service code via IMS Connect. The middleware service code gets the message and populates the output JSP page (i.e. previously generated GUI tool reply data structures) with the reply data. The transaction output data will then be presented to the user.

2. Common Application Metamodel

CAM is used to describe information needed to easily integrate applications developed in common programming models with other systems. The CAM metamodel can be used for both synchronous and asynchronous invocations.

2. a. Common Application Metamodel

The common application metamodel depicted as follows consists of an invocation metamodel and an application-domain interface metamodel which uses language metamodels. For any given application-domain interface metamodel, it may use one or many language metamodels, but, there could be zero or more invocation metamodels.

The common connector metamodel is illustrated in FIG. 3. It has an Invocation Metamodel 301, an Application-Domain Interface Metamodel 303, and a Language Metamodel 305.

2. a. i. Invocation Metamodel

The invocation metamodel 301 consists of one or more of the following possible metadata elements. However, for a particular invocation, it could include only one or many of the following metadata elements.

Message-control information. This includes message control information, such as the message connection name, message type, sequence numbers (if any), and various flags and indicators for response, commit-confirmation, and processing options by which a client or server can control message processing to be synchronous or asynchronous, etc.

The connection name can be used by the application system server to associate all input and output with a particular client. The message type specifies that the message is a response message; or that commit is complete. It can also indicate server output data to the client, or client input data to the server.

Security data—This includes authentication mechanism, and security data, e.g. digital certificates, identity, user name and password, etc. It may also include authorization information to indicate whether the data can be authorized via a role based or ACL (access control list) based authorization.

Transactional semantics—This will carry transaction information, e.g. local vs. global transaction; two-phase commit vs. one-phase commit, and transaction context, etc.

Trace and debug—Trace and debugging information are specified as part of the metamodel.

Precondition and post-condition resource—This describes application state precondition and post-condition relationships.

User data—This includes any special information required by the client. It can contain any data.

2. a. ii. Application-domain Interface Metamodel

The application-domain interface metamodel 303, as discussed earlier, describes signatures for input and output parameters and return types for application system domains.

2. a, iii. Language Metamodel

The language metamodel 305, e.g. COBOL metamodel, is used by enterprise application programs to define data structures (semantics) which represent connector interfaces. It is important to connector tools to show a connector developer the source language, the target language, and the mapping between the two. The CAM language metamodel also includes the declaration text in the model which is not editable (i.e. read-only model). Because the connector/ adapter developer would probably prefer to see the entire COBOL data declaration, including comments and any other documentation that would help him/her understand the business role played by each field in the declaration.

The language metamodel is also to support data driven impact analysis for application productivity and quality assurance. (But, it is not the intention of the CAM to support reproduction of copybooks.)

The language metamodels describing connector data are listed as follows:
C
C++
COBOL
PL/I 2. a. iv. Type Descriptor Metamodel The Type Descriptor metamodel is language neutral and defines the physical realization, storage mapping and the constraints on the realization such as justification. This metamodel provides physical representation of individual fields of a given data structure. The type descriptor metamodel is to support data transformation in an enterprise application integration environment to provide data types mapping between mix languages. It also facilitates data translations from one language and platform domain into another. This metamodel will be used as a recipe for runtime data transformation (or marshaling) with language specific metamodel for overall data structures and fields names.

3. An Example of Common Connector Metamodel

IMS OTMA (Open Transaction Manager Access) is a transaction-based, connectionless client/server protocol within an OS/390 sysplex environment. An IMS OTMA transaction message consists of an OTMA prefix, plus message segments for input and output requests. Both input and output message segments contain llzz (i.e. length of the segment and reserved field), and application data. Only the very first input message segment will contain transaction code in front of the application data. IMS transaction application programs can be written in a variety of languages, e.g. COBOL, PL/I, C, and Java, etc. Therefore, the application data can be in any one of these languages.

As shown in FIG. 4, an IMS OTMA connector metamodel 401 is composed of an invocation metamodel 403 and an IMS transaction message metamodel 405, as well as a COBOL metamodel 407 and a C metamodel 409. As depicted in FIG. 4, the invocation metamodel 401 is the OTMA prefix, and the IMS transaction message metamodel 405 is the application-domain interface metamodel for the IMS application system which uses language metamodels. Metamodels for COBOL 407 and C 409 are shown.

4. Type Descriptor Metamodel

The type descriptor metamodel presents a language and platform independent way of describing implementation types, including arrays and structured types. This information is needed for marshaling and for connectors, which have to transform data from one language and platform domain into another. Inspections of the type model for different languages can determine the conformance possibilities for the language types. For example, a long type in Java is often identical to a binary type (computational-5) in COBOL, and if so, the types may be inter-converted without side effect. On the other hand, an alphanumeric type in COBOL is fixed in size and if mapped to a Java type, loses this property. When converted back from Java to COBOL, the COBOL truncation rules may not apply, resulting in computation anomalies. In addition, tools that mix languages in a server environment (e.g., Java and COBOL in CICS and IMS) should find it useful as a way to determine how faithfully one language can represent the types of another.

Therefore, an instance of the type descriptor metamodel describes the physical representation of a specific data type for a particular platform and compiler.

4. a. TDLang Metamodel

The TDLang metamodel serves as base classes to CAM language metamodels by providing a layer of abstraction between the Type Descriptor metamodel and any CAM language metamodel. All TDLang classes are abstract and common to all the CAM language metamodels. All associations between TDLang classes are marked as "volatile," "transient," or "derived" to reflect that the association is derived from the language metamodel. The TDLang model does not provide any function on its own, but it is the type target for the association from the Type Descriptor metamodel to the language metamodels.

FIG. 9 illustrates the structure of the TDLang Metamodel, with the TDLangClassifier 501, the TDLangComposedType 503 and the TDLangElement 505.

With the TDLang base classes, the Type Descriptor metamodel can be used as a recipe for runtime data transformation (or marshaling) with the language-specific metamodel for overall data structures and field names, without duplicating the aggregation associations present in the language model.

4. b. Type Descriptor Metamodel

This metamodel is a MOF Class instance at the M2 level. FIG. 10 shows the relationships within the type descriptor Metamodel, including the PlatformCompilerType 601, the InstanceTDBase 603, the ArrayTD 605, the AggregateInstanceTD 607, the Simple InstanceTD 609, and the InstanceType 611. The InstanceType 611 comprises definitions of the StringTD 613, the AddressTD 615, the NumberTD 617, and the FloatTD 619. FIG. 11 illustrates a higher level view of the TDLanguageElement and the PlatformCompilerType 601. FIG. 12 illustrates enumerations of signCoding 801, lengthEncoding 803, floatType 805, accessor 807, packedDecimalSign 809, and bitModePad 811.

4. c. Type Descriptor and Language Models

The Type Descriptor model is attached to the CAM Language model by a navigable association between TDLangElement and InstanceTDBase. TDLangElement is the base language model type used to represent a declared data item, i.e., an instance of a type. InstanceTDBase is the base Type Descriptor model type used to represent the implementation-specific instance of this same declared data item. InstanceTDBase is abstract; only one of its subtypes may be instantiated.

It is possible that a data item declared in a programming language may have different implementations. These differences are induced by hardware platform, system platform, and compiler differences. This possibility is modeled by the PlatformCompilerType model type. The association between TDLangElement and PlatformCompilerType is many to one, and the association between PlatformCompilerType and InstanceTDBase is one to one. To navigate from the language model, it is necessary to know what PlatformCompilerType is to be assumed. It is possible that an implementation, upon importing a model instance, will wish to remove from the model the PlatformCompilerType instances that are not of interest.

The association between TDLangElement and InstanceTDBase is modeled in this manner to allow for extending the model to include an association between PlatformCompilerType and a new type that more fully describes the hardware platform, the system platform, and the compiler.

Data element instances may be defined as repeating groups or arrays. This is modeled as a one to many association between InstanceTDBase and the ArrayTD model type. There would be one ArrayTD instance in this association for each dimension, subscript, or independent index of the data element. These instances hold information about the bounds and accessing computations. The association is ordered in the same order as the corresponding association in the language model, and reflects the syntactic ordering of the indices as defined by the programming language. The rationale for this choice is the resulting equivalence of navigation and processing algorithms between the language model and the Type Descriptor model. Another choice, perhaps more advantageous to marshaling engines, would be to have the ordering of the indices from the smallest stride to the largest. This allows a marshaling engine to process the array in its natural storage order, assuming it is laid out in the usual contiguous fashion. A marshaling engine can compute this order by re-sorting the association targets according to the stride formulas if desired.

Array information may be a complex property of the data element or of its type, and various languages and programming practices seem to fall on either side. The typedef facility of C and C++ allows the definition of some array types from typedefs, but only where the array definitions are applied to the topmost elements of typedef aggregates. For example, consider the following typedef:

```
typedefstruct {
    intA;
    struct {
        int C;
        char D;
        struct {
            int F;
            int G;
        }E;
    }B;
}X;
```

This typedef can be used to create a new typedef for a fixed size array, e.g.

typedef X Q[10];

But it is not possible to create a new typedef from X that makes any of the subcomponents of X, e.g., D or E, into an array. This example and many others point out the unclear status of array definitions in typed languages.

An InstanceTDBase type has two concrete subtypes, SimpleInstanceTD and AggregateInstanceTD. SimpleInstanceTD models data elements without subcomponents, while AggregateInstanceTD models data elements with subcomponents. To find the subcomponents of an AggregateInstanceTD, one must navigate back to the corresponding data element declaration in the CAM language model. There, the association between an aggregate type and its subcomponents may be navigated, leading to a set of subcomponent data elements, each of which has one or more corresponding instances in the Type Descriptor model. This introduces some model navigation complexity, but avoids duplicating the aggregation hierarchy in both the language and the Type Descriptor models. The additional processing complexity of traversal is not great, and considerable simplification is obtained in algorithms that would modify the model to add, delete or rearrange subcomponents in an aggregation.

A SimpleInstanceTD model type is also associated one to one with a BaseTD model type. The BaseTD model type is specialized to hold implementation information that is common for all data elements of the same language type. The information that describes a 32-bit signed binary integer on a specific hardware/software platform is thus instantiated only once in a given model instantiation, no matter how many data elements may be declared with this type.

One may contemplate an association between TDLangClassifier and BaseTD matching the association between TDLangElement and InstanceTDBase. However, this is problematic in that constructions that the language regards as simple types (e.g., strings) may not map directly to simple hardware/software types. Rather than introduce more mechanisms into the Type Descriptor model to describe string implementations, a specialization of BaseTD is utilized which describes the common string implementations.

Various attributes in the TypeDescriptor model are suffixed with the string "formula." These attributes contain information that may in some cases be impossible to compute without access to data created only at run-time. An example is the current upper bound of a variable-sized array or the offset to an element that follows another element whose size is only known at run-time. Such information could be included as values in a model instance, but this would require a model instance for each run-time instance, and would mean that the model could only be constructed at run-time, requiring the model definition to include factories and other apparatus to create model instances at run-time. A model that can be constructed from platform and compiler knowledge is much more useful, and the formulas provide a way to define concrete values when the run-time information is available. These formulas may be interpreted by marshaling engines, or they may be used to generate marshaling code, which is loaded and executed by the marshaling engine on demand.

4. d. Formulas

As used in connection with formulas, "field" refers to a component of a language data structure described by the Type Descriptor model, while "attribute" denotes part of the model, and has a value representing a "property" of the field. Thus the value of a field means a run-time value in a particular instance of a language data structure, whereas the value of an attribute is part of the description of a field in a language data structure, applies to all instances of the data structure, and is determined when the data structure is modeled.

For most attributes in an instance of the Type Descriptor model, the value of the attribute is known when the instance is built, because the properties of the fields being described, such as size and offset within the data structure, are invariant. But if a field in a data structure is defined using the COBOL OCCURS DEPENDING ON construct or the PL/I Refer construct, then some properties of the field (and properties of other fields that depend on that field's value) cannot be determined when the model instance is built.

Properties that can be defined using these language constructs are string lengths and array bounds. A property that could indirectly depend on these language constructs is the offset of a field within a structure, if the field follows a variable-size field.

In order to handle these language constructs, properties of a field that could depend on these constructs (and thus the values of the corresponding attributes), are defined with strings that specify a formula that can be evaluated when the model is used.

However, if a property of a field is known when the model instance is built, then the attribute formula simply specifies an integer value. For example, if a string has length 17, then the formula for its length is "17".

The formulas mentioned above are limited to the following:
Unsigned integers
The following arithmetic integer functions

| | |
|---|---|
| neg(x) := -x | // prefix negate |
| add(x,y) := x + y | // infix add |
| sub(x,y) := x - y | // infix subtract |
| mpy(x,y) := x*y | // infix multiply |
| div(x,y) := x/y | // infix divide |
| max(x,y) := max(x,y) | |
| min(x,y) := =min(x,y) | |
| mod(x,y) := x mod y | |

The mod function is defined as mod(x,y)=r where r is the smallest non-negative integer such that x−r is evenly divisible by y. So mod(7,4) is 3, but mod(−7,4) is 1. If y is a power of 2, then mod(x,y) is equal to the bitwise-and of x and y−1.

The val function

The val function returns the value of a field described by the model. The val function takes one or more arguments, and the first argument refers to the level-1 data structure containing the field, and must be either:

the name of a level-1 data structure in the language model
the integer 1, indicating the level-1 parent of the variable-size field. In this case, the variable-size field and the field that specifies its size are in the same data structure, and so have a common level-1 parent.

The subsequent arguments are integers that the specify the ordinal number within its substructure of the (sub)field that should be dereferenced.

By default, COBOL data fields within a structure are not aligned on type-specific boundaries in storage. For example, the "natural" alignment for a four-byte integer is a full-word storage boundary. Such alignment can be specified by using the SYNCHRONIZED clause on the declaration. Otherwise, data fields start immediately after the end of the preceding field in the structure. Since COBOL does not have bit data, fields always start on a whole byte boundary.

4. d. i) Formula Examples for COBOL

The examples use the proposed inline comment indicator "*>" from the draft standard. It is not yet legal COBOL usage.

1. Consider the following data description:

| *>Field | Offset |
|---|---|
| 01 Used-Car. | *>"0" |
| 02 Summary. | *>"0" |
| 03 Make pic x(36). | *>"0" |
| 03 Model pic x(44). | *>"36" |
| 03 VIN pic x(13). | *>"80" |
| 03 Color pic x(10). | *>"93" |
| 88 Red value 'Red'. | |
| 88 White value 'White'. | |
| 88 Blue value 'Blue'. | |
| 02 History. | *>"103" |
| 03 Mileage pic 9(6). | *>"103" |
| 03 NumClaims binary pic 9. | *>"109" |
| 03 InsCode pic x. | *>"111" |
| 03 Claims. | *>"112" |
| 04 Claim occurs 1 to 9 times depending on NumClaims. | *>stride(1) = "157" |
| 05 ClaimNo pic x(12). | |
| 05 ClaimAmt binary pic 9(5). | |
| 05 Insurer pic x(38). | |
| 05 Details pic x(100). | |
| 02 Price comp pic 9(5)v99. | *>"add(112,mpy(val(1,2,2),157))" |

The offset of Model is straightforward, and is given by the formula "36". So is that of Claims, which is "112".

But because the array Claim can occur a variable number of times, the structure History is a variable-size field. Thus the offset of Price, which immediately follows Claims, requires a more complicated formula, involving the array stride (the distance between successive elements along a specific dimension). For Claim, there is only one dimension, and the formula for its stride is "154". Thus the formula for the offset of Price is:

"add(112, mpy(val(1,2,2),154))"

The first argument of the val function is 1, meaning that the field containing the value at run-time, NumClaims, is in the same level-1 structure, Used-Car, as the field, Price, whose offset is specified by the formula. The other two arguments are 2 and 2. The first 2 refers to the second immediate subcomponent, History, of Used-Car. The second 2 means that the field to be dereferenced is the second component of History, that is, NumClaims.

If the OCCURS DEPENDING ON object were in a separate structure, the third subcomponent of level-1 structure Car-Data, say, then the val function would be "val(Car-Data,3)".

COBOL structure mapping is top-down, although the direction doesn't make any difference unless the SYNCHRONIZED clause is specified on the data declaration. Specifying SYNCHRONIZED forces alignment of individual fields on their natural boundaries, and thus introduces "gaps" into the structure mapping. Consider the following data structure, which is identical to the previous example, except for the SYNCHRONIZED clause:

| *>Field | Offset |
|---|---|
| 01 Used-Car SYNCHRONIZED | *>"0" |
| 02 Summary. | *>"0" |
| 03 Make pic x(36). | *>"0" |
| 03 Model pic x(44). | *>"36" |
| 03 VIN pic x(13). | *>"80" |
| 03 Color pic x(10). | *>"93" |
| 88 Red value 'Red'. | |
| 88 White value 'White'. | |
| 88 Blue value 'Blue'. | |
| 02 History. | *>"103" |
| 03 Mileage pic 9(6). | *>"103" |
| 03 NumClaims binary pic 9. | *>"110" |
| 03 InsCode pic x. | *>"112" |
| 03 Claims. | *>"113" |
| 04 Claim occurs 1 to 9 times depending on Num Claims. | *>stride(1) = "160" |
| 05 ClaimNo pic x(14). | |
| 05 ClaimAmt binary pic 9(5). | |
| 05 Insurer pic x(39). | |
| 05 Details pic x(100). | |
| 02 Price comp pic 9(5)v99. "add(add(113, mpy(val(1,2,2),160)), 3)" | *> |

To position the binary fields on their appropriate half-word or full-word storage boundaries, COBOL introduces padding, known as "slack bytes", into the structure. Working top-down, this padding is introduced immediately before the field needing alignment. So there is one byte of padding between Mileage and NumClaims.

For an array, such as Claim, COBOL not only adjusts the padding within an element, but also the alignment of each element of the array. In the example, the first occurrence of Claim starts one byte past a full-word boundary. Because the field ClaimNo is an exact number of full-words long, it ends one byte past a full-word boundary, so COBOL inserts three bytes of padding immediately before the binary full-word integer ClaimAmt. And to align subsequent occurrences, so that they too start one byte past a full-word boundary like the first, and can thus have an identical configuration, COBOL adds three bytes of padding at the end of each occurrence.

Finally, after padding, each occurrence of Claim (starts and) ends one byte past a full-word boundary, so COBOL puts three bytes of padding before the binary field Price. As a result of all these extra bytes, the formula for the offset of Price has changed considerably from the unaligned example, and is now:

"add(add(113,mpy(val(1,2,2),160)),3)"

There are several differences between the OCCURS DEPENDING ON construct and PL/I's Refer option. Storage for COBOL structures is always allocated at the maximum size, whereas PL/I structures are allocated at the actual size specified by the Refer option. It is legal and usual to change the number of occurrences in a particular instance of a variable-size COBOL array, and this has the effect of changing the location and offset of any fields that follow the array. For PL/I, the value of the Refer object of a particular instance of a structure is intended to be fixed during execution Thus aligned objects following a variable-size field are always correctly aligned for each instance of the structure, because the amount of padding is computed uniquely for each instance, as determined by the Refer option. By contrast, the amount of padding for any aligned fields following a variable-size COBOL array is computed assuming the maximum array size, and is fixed at compile time. If the array is smaller than its maximum size, then the alignment will typically be incorrect. For instance in this example:

| |
|---|
| 1 a sync. |
| 2 b binary pic 9. |
| 2 c pic x occurs 1 to 5 times depending on b. |
| 2 d binary pic 9(9). |

COBOL inserts one byte between c and d. The alignment of d is therefore correct for only two values of b, the maximum, 5, and 2.

As noted above, the formulas describe not only offsets of fields within a structure, but also properties of arrays, such as bounds and strides. COBOL does not have true multi-dimensional arrays, although element references do use multiple subscripts. Instead, COBOL has arrays of arrays, as in the following simple example:

| | |
|---|---|
| 1 a. | *<offset "0" |
| 2 d1 occurs 5 times. | *<offset = "0" |
| | *<lbound(1) = "1" |
| | *<hbound(1) = "5" |
| | *<stride(1) = "168" |
| 3 d2 occurs 6 times. | *<offset = "0" |
| | *<lbound(2) = "1" |
| | *<hbound(2) = "6" |
| | *<stride(2) = "28" |
| 4 e1 binary pic 9(9) occurs 7 times. | *<offset = "0" |
| | *<lbound(3) "7" |
| | *<hbound(3) = "7" |
| | *<stride(3) = "4" |

The program can refer to slices of the array by subscripting the higher-level container fields, for example, d1(2) or d2(3, 4), but the normal kind of reference is to the low-level elements using the full sequence of subscripts, for instance, e1(4, 5, 6). To locate element e1(m, n, o) using these stride formulas, one would take the address of a and add to it $(m-1)*168+(n-1)*28+(o-1)*4$. For COBOL, the lower bound of an array subscript is always 1. That is, the first element is always element(1), and vice versa.

Needless to say, any dimension of the array can have the OCCURS DEPENDING ON clause, and the array can be followed by other fields, which complicates the formulas a lot. Consider the example:

| | |
|---|---|
| 1 a. | |
| 2 x1 binary pic 9. | *<offset = "0" |
| 2 x2 binary pic 9. | *<offset = "2" |
| 2 x3 binary pic 9. | *<offset = "4" |
| 2 d1 occurs 1 to 5 times | *<offset = "6" |

-continued

| | |
|---|---|
| depending on x1. | *<lbound(1) = "1"<br>*<hbound(1) = "val(1,1)"<br>*<stride(1) = "mpy(val(1,2),mpy(val(1,3),4))" |
| 3 d2 occurs 1 to 6 times<br>depending on x2. | *<offset = "6"<br>*<lbound(2) = "1"<br>*<hbound(2) = "val(1,2)"<br>*<stride(2) = "mpy(val(1,3),4)" |
| 4 e1 binary pic 9(9)<br>occurs 1 to 7 times<br>depending on x3. | *<offset = "6"<br>*<lbound(3) = "1"<br>*<hbound(3) = "val(1,3)"<br>*<stride(3) = "4" |
| 2 b binary pic 9(5). | *<offset = "see below!" |

Computing the address of a particular element still involves the stride formulas, but these are no longer simple integers. The address of element el(m, n, o) in the above example is given by taking the address of a and adding to it:

$$(m-1)*stride(1)+(n-1)*stride(2)+(o-1)*stride(3), \text{ i.e.,}$$

$$(m-1)*4*val(1,3)*val(1,2)+(n-1)*4*val(1,3)+(o-1)*4.$$

Similarly, these stride formulas are used in the formula for the offset of b:

"add(6, mpy(val(1,1), mpy(val(1,2), mpy(4,val(, 3)))))

4. e. Type Descriptor Specification 4. e. i. TDLang Metamodel Specification

TDLang Classes—General Overview. TDLang classes serve as a layer of abstraction between any CAM language model and the TypeDescriptor model.

Since any CAM language model can plug into the TDLang model, the Type Descriptor model only needs to understand how to interface with TDLang in order to access any CAM language model.

The TDLang model does not provide any function on its own and therefore only makes sense when it is attached to a language model. TDLang is common to all the CAM language models and is the type target for the association from TypeDescriptors to the language models.

Note all TDLang classes are abstract and they serve as the base classes to the language metamodels.

TDLangClassifier. TDLangClassifier is the parent class of all language-specific Classifier classes and TDLangComposedType. The TDLangSharedType association is derived from the language's "+sharedType" association from Element to Classifer class. The association should be marked "volatile," "transient," or "derived" to reflect that the association is derived from the language model. The TDLangClassifier is derived from TDLangModelElement.

TDLangElement. TDLangElement is the parent class of all language-specific Element classes. The tdLangTypedElement association is derived from the language's "+typedElement" association from Classifer to Element class. The association should be marked "volatile", "transient", and "derived" to reflect that the association is derived from the language model.

The tdLangElement association is derived from the language's "+element" association from Classifer to Element class. The association should be marked "volatile," "transient," or "derived" to reflect that the association is derived from the language model.

TDLangComposedType. The TDLangComposedType is the parent class of all language-specific ComposedTypes. The TDLangGroup association is derived from the language's "+group" association from Element to ComposedType class. The association should be marked "volatile," "transient," or "derived" to reflect that the association is derived from the language model. The TDLangComposedType is derived from TDLangClassifier.

4. e. ii. Type Descriptor Metamodel Specification

The Type Descriptor package defines a model for describing the physical implementation of a data item type. This model is language neutral and can be used to describe the types of many languages. Inspections of the type model for different languages can determine the conformance possibilities for the language types. For example, a long type in Java is often identical to a binary type in COBOL, and if so, the types may be interconverted without side effect. On the other hand, an alphanumeric type in COBOL is fixed in size and if mapped to a Java type, will lose this property. When converted back from Java to COBOL, the COBOL truncation rules may not apply, resulting in computation anomalies.

AggregateInstanceTD. For each instance of an aggregate, there is an instance of this class. To find the children of this aggregate, one must navigate the associations back to language Classifier then downcast to language Composed Type and follow the association to its children.

Derived from InstanceTDBase

Public Attributes:

union: boolean=false

Distinguishes whether the aggregation is inclusive (e.g. a structure) or exclusive (e.g. a union).

If union=true, storage might be overlaid and as a result the interpretation of the content may be uncertain.

ArrayTD. ArrayTD holds information for array types.

Public Attributes:

arraryAlign: int

Alignment requirements in addressable units for each element in the array.

strideFormula: string

A formula that can be used to calculate the displacement address of any element in the array, given an index.

strideInBit: boolean

True indicates strideFormula value in bits

False indicates strideFormula value in bytes upperBoundFormula:String

Declared as a String for instances when this value is referenced by a variable.

This attribute supplies the upperbound value of a variable size array

Upperbound is required when traversing back up the entire structure.

lowerBoundFormula: String

Declared as a String for instances when this value is referenced by a variable.

This attribute supplies the lowerbound value of a variable size array.

InstanceTDBase. InstanceTD has instances for each declared variable and structure element.

To find the parent of any instance (if it has one) one must navigate the associations back to TDLangElement, follow the association to TDLangClassifier to locate the parent, then follow the associations back into the TypeDescriptor model.

Public Attributes:

offsetFormula: string

A formula for calculating the offset to the start of this instance.

This attribute is String because this field may not always be an integer value. For example, (value(n)+4) could be a possible value.

NOTE: The offset value is calculated from the top-most parent. (e.g., for a binary tree A→B, A→C, B→D, B→E. The offset to D is calculated from A to D, not B to D)

contentSizeFormula: string

Formula for calculating the current size of the contents allocSizeFormula: string Formula for calculating the allocated size of the instance formulaInBit: boolean True indicates offsetFormula, contentSizeFormula, and allocSizeFormula values are in bits False indicates offsetFormula, contentSizeFormula, and allocSizeFormula values are in bytes defaultEncoding: String Physical encoding—how many bits used to encode code points, how are the code points mapped onto bit patterns Contains info on how string content is encoded: EBCDIC, ASCII, UNICODE, UTF-8, UTF-16, codepage numbers, etc. . . .

accessor: enumeration

Specifies access-rights for this element.

defaultBigEndian: boolean

True if this element is Big Endian format.

floatType: enumeration

Specifies this element's float type.

PlatformCompilerType. A specific data type for a particular platform and compiler. NOTE: There needs to be some way to identify the platform and compiler. This class can be specializedor have an attribute, or be simplified by putting an attribute on InstanceTDBase.

Public Attributes:

platformCompilerType: String

This attribute specifies the type of compiler used to create the data in the language model. Usage of this string is as follows:

"Vendor name, language, OS, hardware platform" (e.g., "IBM, COBOL, OS390, 390" or "IBM, PLI, WinNT, Intel")

SimpleInstanceTD. An instance of a Simple type in the language model. Derived from InstanceTDBase NumberTD All numbers representations.

Currently includes Integers and Packed Decimals

Note required fields for these types of Numbers:

Integer

Base=2

MSBU=0 or 1

Signed/Unsigned

Size (in bytes)=1,2,4,8 (16)

Packed Decimal

Base=10

MSBU=0

Signed

Width=1-63

Float

Base=2(IEEE), 16(Hex)

MSBU=0 or 1

Signed

Size (in bytes)=4,8,16

Encoding Details . . .

Derived from BaseTD

Public Attributes:

base: int

The base representation of this number. 2=binary, 10=decimal, 16=hex,

. . .

baseWidth: int

Number of bits used to represent base:

e.g. binary=1, decimal=8, packed=4 baseInAddr: int

Number of baseWidth units in addressable storage units—e.g. decimal=1, packed=2, binary=8 where the addressable unit is a byte. If the addressable unit was a 32 bit word, decimal would be 4, packed would be 8, and binary would be 32.

baseunits: int

Number of base units in the number. This times the base width must be less than or equal to the width times the addrUnit.

For example, a 24 bit address right aligned in a 32 bit word would have base=1, basewidth=24, baseInAddr=8, width=4.

signCoding: enumeration

A set of enumerations—2's complement, 1's complement, and sign magnitude for binary; zone signs for decimal, packed signs for packed decimal, and unsigned binary, unsigned decimal.

checkValidity: boolean

True if language model is required for picture string support packedDecimalSign: enumeration Used to determine the code point of the sign in COBOL decimal numbers, where the sign is combined with the leading or trailing numeric digit.

FloatTD

Floating points

Derived from BaseTD

Public Attributes:

floatType: enumeration

Specifies this element's float type.

1 StringTD

Alphanumeric type

Derived from BaseTD

Public Attributes:

encoding: String

Physical encoding—how many bits used to encode code points, how are the code points mapped onto bit patterns Contains info on how string content is encoded: EBCDIC, ASCII, UNICODE, UTF-8, UTF-16, codepage numbers, etc. . . .

lengthEncoding: enumeration

Possible values for lengthEncoding:

Fixed length (where total length equals declared string length)

Length prefixed (where total length equals declared string length plus length of header bytes; usually 1, 2, or 4 bytes)

Null terminated (known as varyingZ strings in PL/I) (where a null symbol is added to the end of string; so the maximum length could be up to declared string length plus one byte to represent null character)
maxLengthFormula: String
Formula specifying the maximum length of this string.
checkvalidity: boolean
True if language model is required for picture string support
textType: String=Implicit
Value is 'Implicit' or 'Visual'
orientation: StringTD=LTR
Value is 'LTR', 'RTL', 'Contextual LTR', or 'Contextual RTL'
where LTR=Left to Right
and RTL=Right to Left
Symmetric: boolean true
True if symmetric swapping is allowed
numeralShapes: String=Nominal
Value is 'Nominal', 'National', or 'Contextual'
textShape: String=Nominal
Value is 'Nominal', 'Shaped', 'Initial', 'Middle', 'Final', or 'Isolated'
AddressTD
Type to represent pointers/addresses
Rationale for this class:
Addresses should be considered separate from NumberTD class because some languages on certain machines (e.g., IBM 400) represent addresses with additional information, such as permission type (which is not represented in NumberTD class)
Derived From BaseTD
Public Attributes:
permission: String
Specifies the permission for this address. Used primarily for AS/400 systems.
bitModePad: enumeration
Specifies the number of bits for this address. Used to calculate padding.
BaseTD
The base class of typeDescriptor.
The BaseTD model type is specialized to hold implementation information which is common for all data elements of the same language type. The information which describes a 32 bit signed binary integer on a specific hardware/software platform is thus instantiated only once in a given model instantiation, no matter how many data elements may be declared with this type.
Public Attributes:
addrUnit: enumeration
Number of bits in storage addressable unit
bit/byte/word/dword
width: int
Number of addressable storage units in the described type. This can be 1, 8, 16, 32 bits.
alignment: int
Required alignment of type in address space—e.g. word aligned 32 bit integer would have alignment of 4
nickname: int
Name of the base element. This should uniquely identify an instance of a simple type to allow logic based on name rather than logic based on combinations of attributes. E.g. "S390Binary31_0" for a 32 bit S/390 unsealed binary integer bigEndian: boolean
True if this element is Big Endian format.
Stereotypes
bitModePad
Public Attributes:
16 bit:
24 bit:
31 bit:
32 bit:
64 bit:
128 bit:
signCoding
Note that this model does not include the following COBOL usages:
1 POINTER
  PROCEDURE-POINTER
  OBJECT REFERENCE
Public Attributes:
twosComplement:
onesComplement:
signMagnitude:
zoneSigns:
packedSigns:
unsignedBinary:
unsignedDecimal:
lengthEncoding
Public Attributes:
fixedLength:
lengthPrefixed
nullTerminated:
floatType
Public Attributes:
Unspecified:
IEEEextendedIntel
For IEEE extended floats running on Intel Platform
IEEEextendedAIX:
For IEEE extended floats running on AIX Platform
IEEEextendedOS390:
For IEEE extended floats running on OS/390 Platform
IEEEextendedAS400:
For IEEE extended floats running on AS400 Platform
IEEEnonextended:
For IEEE non-extended floats
IBM390Hex:
For Hexadecimal floats running on IBM OS/390
IBM400Hex:
For Hexadecimal floats running on IBM AS400
accessor
Public Attributes:
ReadOnly:
WriteOnly:
ReadWrite
NoAccess
packedDecimalSign
Public Attributes:
MVS:
MVSCustom:
NT/OS2/AIX:

5. COBOL Language Metamodels

The COBOL metamodel is used by enterprise application programs to define data structures (semantics) which represent connector interfaces.

FIG. 13 illustrates a COBOL metamodel to define data structure semantics which represent connector interfaces. This metamodel is also a MOF Class instance at the M2 level FIG. 14 illustrates the associations between the COBOL metamodel with the TDLang base classes which are the TDLangClassifier, the TDLanguageComposedType, and the TDLangElement.

FIG. 15 illustrates an enumeration of the COBOL usage values in the COBOL Metamodel.

The goal of this COBOL model is to capture the information that would be found in the Data Division. This model is intended to be used only as read-only to convert COBOL data division into it's XML equivalent. This model is not intended to be used as a converter from XML code into a COBOL data division equivalent. As a result, initialValues of elements are not captured in the model.

COBOLSimpleType

COBOLSimpleType is an abstract class that contains attributes shared by all simple types in the COBOL language.

Derived from COBOLClassifier

Public Attributes:

usage: COBOLUsageValues

Usage contains the data type as defined in COBOLUsageValues.

Usage defines the format of the data in memory. If none is specified in the COBOL source, the default is "display". Note that the popular COMP-3 is equivalent to packed Decimal.

pictureString: String

This is a canonical form of the picture string specified in the source. It is *not* necessarily identical to the picture string given in the program!

Procedure to arrive at the canonical form of the picture string:

1. Expand any parenthesized characters
2. Construct parenthesized representation for any sequences of identical characters which are longer than 4 characters.

For example:

start with XXX999(3)

after step 1 you get: XXX99999 after step 2 you get: XXX9(5)

This canonical form yields the shortest equivalent picture string. The canonical form is beneficial for equivalence checking.

Synchronized: Boolean=false

This boolean attribute corresponds to the SYNCHRONIZED or SYNC clause that may optionally be specified for an element.

Note that the COBOL language defines an additional clause—RIGHT/LEFT—which may follow the SYNCHRONIZED clause.

However, IBM's implementation of COBOL does support this additional CLAUSE as documentation only—all elements defined as SYNCHRONIZED are automatically synchronized left.

Public Operations:

getCanonicalPictureString (pictureString: String): String

Returns the condensed value of this string. For example, although the pictureString attribute may contain a picture string of 9999v99, getCanonicalPictureString( ) will return 9(4)v9(2) as the value.

COBOLElement

A COBOLElement represents every data definition in the COBOL program.

For example:

01 EMPLOYEE

03 SERIAL-NUMBER PIC 9(5).

03 DEPARTMENT PIC (5).

EMPLOYEE, SERIAL-NUMBER, and DEPARTMENT are all COBOLElements.

Derived from TDLangElement

Public Attributes:

level: String

Level refers to the data number this element was declared in. redefined: Boolean=false COBOLVariableLengthArray A COBOLVariableLengthArray should be instantiated whenever the source for a COBOLElement has the following syntax:

LEVEL ELEMENTNAME1 OCCURS X1 TO X2 TIMES DEPENDING ON ELEMENTNAME2.

where X1 and X2 can be any integers 0 and higher and X2>X1. ELEMENTNAME2 must be defined before ELEMENTNAME1.

COBOLVariableLengthArray has a single required association that specifies which element this array depends on.

Derived from COBOLFixedLengthArray

Public Attributes:

minUpper: Integer

In the case when maxUpper (max upper bound) belongs to VariableArray, maxUpper denotes the absolute upper bound of the array that can be allocated in memory. The actual maximum is denoted by the value of the element it refers to; which it gets by calling the "dependingOn" association.

minUpper (minimum upper bound) is used to capture the COBOL syntax that reads OCCURS 4 to 7 TIMES DEPENDING ON X1. In this case, minUpper equals 4 and maxUpper equals 7, and the actual upper bound depends on the value of X1.

lower (lower bound) is always 1 (one) in the case of COBOL but is included for consistency with other languages and for clarity.

COBOLRedefiningElement

The REDEFINES clause allows you to use different data description entries to describe the same computer storage area.

Example of this class in use:

---

1 TEST
2 Y PIC X(4)
2 YR REDEFINES Y BINARY PIC 9(5)
TypeDef = False for Redefine/UNION
Derived from COBOLElement

---

COBOLComposedType

The COBOLComposedType class represents a nested declaration that contains additional elements. COBOLComposedType class is an aggregate of COBOLElements COBOLComposedType is also the parent class of COBOLRedefines.

For example:

```
       01 STUDENT.
       05 CLASSES OCCURS 5.
       10 CLASSNAME PIC X(20).
       10 CLASSNUM PIC 9(4).
```

STUDENT is defined by COBOLComposedElement. Its aggregation only point to the CLASSES item, which is a COBOLElement. CLASSES is itself defined by a COBOLComposedElement.

Derived from COBOLClassifier, TDLangComposedType

COBOL88Element

COBOL88Element represents the COBOL 88 data level.

For example:

```
   TESTX PIC.
      88 TRUEX VALUE 'T' 't'. *(TRUEX has 2 values)
      88 FALSEX VALUE 'F' 'f'. *(FALSEX has 2 values)
```

Where TRUEX and FALSEX are condition names for the TESTX variable if value equals ('T' or 't') or ('F' or 'f'), respectively.

So if TESTX='T' or 't' then TRUEX=TRUE and FALSEX=FALSE;

If TESTX='F' or 'f' then FALSEX=TRUE and TRUEX=FALSE;

Public Attributes:

name: String
  Specifies the name or handle of the COBOL88Element.
COBOL88ElementValue Example of this class in use:

```
1 TESTX PIC X.
   88 TRUEX VALUE 'T' 't'. *(TRUEX has 2 values)
   88 FALSEX VALUE 'F' 'f'. *(FALSEX has 2 values)
   88 UA VALUE 'A' THRU 'I' 'J' THRU 'R' 'S' THRU 'Z' '&' '-'.
      *UA has 5 values; the first 3 are ranges
```

Rationale for this class:

This class exists because each COBOL88Element can contain more than 1 value. For example, TRUEX contains 2 values, 'T' and 't'. Thus this class can be instatiated more than once (but at least once) per COBOL88Element (and thus the 1 . . . * cardinality)

For range values such as 'A' THRU 'I' in UA, lowerLimit='A', upperLimit='I', and range=true. Also note that when using the THRU keyword, lowerLimit must be less than upperLimit.

For non-range values such as 'T' and 't' we have decided that we would use lowerLimit field to represent the value.

Public Attributes:

lowerLimit: String
  lowerLimit refers to the lower bound of the THROUGH range
upperLimit: String
  upperLimit refers to the upper bound of the THROUGH range
Range: Boolean If range is set to true, literal-1 must be less than literal-2, unless the associated data item is a windowed date field.

COBOLAlphaNumericType

The PICTURE character-string must consist of either of the following:

The symbol

Combinations of the symbols A, X, and 9 (A character-string containing all As or all 9s does not define an alphanumeric item.)

Other clauses: USAGE DISPLAY must be specified or implied.

Any associated VALUE clause must specify a nonnumeric literal or a figurative constant.

Derived from COBOLSimpleType

Public Attributes:

JustifyRight: Boolean=false
  This boolean corresponds to the JUSTIFIED (or JUST) clause. Note that JUST and JUST RIGHT carry the same meaning.

COBOLNumericEditedType

The PICTURE character-string can contain the following symbols:
  B P V Z 9 0 / , . +− CR DB * cs Other clauses: USAGE DISPLAY must be specified or implied.

Any associated VALUE clause must specify a nonnumeric literal or a figurative constant. The literal is treated exactly as specified; no editing is done.

Edited Types are different from non-edited types in that the decimal character is stored in memory for edited types and not stored in non-edited types.

Derived from COBOLSimpleType

Public Attributes:

BlankWhenZero: Boolean
  This boolean corresponds to the BLANK WHEN ZERO clause.
  True if BLANK WHEN ZERO.

currencySign: String
  This string represents different currency signs used in the world, for example, $, £, DM, etc. . . .

Decimal: Boolean
  The Decimal boolean exchanges the functions of the peroid and comma in picture strings and numeric values.
  If TRUE, decimals are used (e.g., 1,234.56)
  If FALSE, commas are used (e.g., 1.234,56)

COBOLNumericType

Types of numeric items are:

Binary

Packed decimal (internal decimal)

Zoned decimal (external decimal)

The PICTURE character-string can contain only the symbols 9, P, S, and V.

For numeric date fields, the PICTURE character-string can contain only the symbols 9 and S.

Examples of valid ranges
  PICTURE Valid Range of Values
  9999 0 through 9999
  S99 −99 through +99
  S999V9 −999.9 through +999.9

PPP999 0 through 0.000999
S999PPP −1000 through −999000 and +1000 through +999000 or zero Other clauses: The USAGE of the item can be DISPLAY, BINARY, COMPUTATIONAL, PACKED-DECIMAL, COMPUTATIONAL-3, COMPUTATIONAL-4, or COMPUTATIONAL-5.

Possible usage values for this class are 'binary', 'packed-Decimal' and 'display', which are represented by comp-1 and comp-2 declarations, respectively.

Derived from COBOLSimpleType

Public Attributes:

Signed: Boolean
  This boolean corresponds to the SIGN clause.
  True if number is signed.

SignLeading: Boolean
  This attribute corresponds to the LEADING (versus TRAILING) clause.
  True if LEADING.

SignSeparate: Boolean
  This boolean corresponds to the SEPARATE clause.
  True is SEPARATE.

currencySymbol: char
  This character represents the symbol used in COBOL to represent currencySign. (e.g., $=$, L=£, D=DM, etc. ...)

trunc: String
  The Trunc option determines whether decimal picture constraints must be honored for binary data items.
  Values for Trunc are:
  STD, OPT, and BIN
  TRUNC(STD) conforms to the COBOL 85 Standard, while
  TRUNC(OPT) and
  TRUNC(BIN) are IBM extensions.
  For more information on the Trunc attribute, please refer to "COBOL/VSE Programming Guide"

numproc: String
  Numproc(PDF) imposes stricter standards on decimal sign values.
  Values for Numproc are:
  NOPDF, PDF, and MIG.
  Use NUMPROC(NOPFD) if you want the compiler to perform invalid sign processing. This option is not as efficient as NUMPROC(PFD); object code size will be increased, and there may be an increase in run-time overhead to validate all signed data.
  NUMPROC(NOPFD) and NUMPROC(MIG) conform to the COBOL 85 Standard.

Decimal: Boolean
  The Decimal boolean exchanges the functions of the peroid and comma in picture strings and numeric values.
  If TRUE, decimals are used (e.g., 1,234.56)
  If FALSE, commas are used (e.g., 1.234,56)

COBOL66Element

COBOL66Element represents the COBOL 66 data level. For example:

```
01 DATA-GROUP PIC 9.
  03 DATA1 VALUE 1.
  03 DATA2 VALUE 2.
```

*-continued*

```
  03 DATA3 VALUE 3.
  66 SUB-DATA RENAMES DATA1 THROUGH DATA2.
  66 AKA-DATA3 RENAMES DATA3.
```

In this example SUB-DATA refers to contents in DATA1 and DATA2.

Public Attributes:

name: String
  Specifies the name or handle of the COBOL66Element.

COBOLFixedLengthArray

A COBOLFixedLengthArray should be instantiated whenever the source for a COBOLElement has the following syntax:

LEVEL ELEMENTNAME OCCURS X TIMES.

where X can be any integer 1 or higher.

In the case when maxUpper (max upper bound) belongs to FixedArray, maxUpper denotes the upper bound of the array that is allocated in memory.

lower (lower bound) is always 1 (one) in the case of COBOL but is included for consistency with other languages and for clarity.

COBOLDBCSType

The PICTURE character-string can contain the symbol(s) G, G and B, or N.

Each G, B or N represents a single DBCS character position.

The entire range of characters for a DBCS literal can be used.

Other clauses: When PICTURE clause symbol G is used, USAGE DISPLAY-1 must be specified.

When PICTURE clause symbol N is used, USAGE DISPLAY-1 is assumed and does not need to be specified.

Any associated VALUE clause must specify a DBCS literal or the figurative constant SPACE/SPACES.

The DBCSType occupies 2 bytes per character.

Derived from COBOLSimpleType

COBOLAlphaNumericEditedType

The PICTURE character-string can contain the following symbols:
A X 9 B 0 /

The string must contain at least one A or X, and at least one B or 0 (zero) or /.

The contents of the item in standard data format must be two or more characters from the character set of the computer.

Other clauses: USAGE DISPLAY must be specified or implied.

Any associated VALUE clause must specify a nonnumeric literal or a figurative constant. The literal is treated exactly as specified; no editing is done.

Edited Types are different from non-edited types in that the decimal character is stored in memory for edited types and not stored in non-edited types.

Derived from COBOLSimpleType

COBOLClassifier

COBOLClassifier class is the parent class of COBOL-ComposedType and COBOLSimpleType and contains the 'typedef attribute.

The best way to think of the effect of TYPEDEFs in COBOL is as lexical substitution, similar to simple C macros. Replace the TYPE clause by everything following the TYPEDEF keyword. Then, after adjusting the level numbers appropriately, the result has to be legal COBOL (except for the adjusted level numbers themselves, which can exceed 49). The actual rules are quite complicated, as you might expect, so rather than describe those, here are some examples:

A simple way of enforcing shop standards for financial data:

Definition:

1 uniform-amount typedef usage comp pic s9(6)v99 synchronized.

Reference:

1 account-record.

. . .

5 prior-balance type uniform-amount.
5 current-balance type to uniform-amount.

. . .

Derived from TDLangClassifier
Public Attributes:
Typedef: boolean
   User-defined types are introduced by using the TYPEDEF attribute, and referred to by the TYPE clause. If type is user-defined, 'typedef'=true.
   TypeDef=False for Redefine/UNION
name: String
   Specifies the name or handle of the COBOLClassifier.
COBOLAlphabeticType
The PICTURE character-string can contain only the symbol A.
The contents of the item in standard data format must consist of any of the letters of the English alphabet and the space character.
Other clauses: USAGE DISPLAY must be specified or implied.
Any associated VALUE clause must specify a nonnumeric literal containing only alphabetic characters, SPACE, or a symbolic-character as the value of a figurative constant.
Derived from COBOLSimpleType
Public Attributes:
JustifyRight: Boolean=false
   This boolean corresponds to the JUSTIFIED (or JUST) clause. Note that JUST and JUST RIGHT carry the same meaning.
COBOLObjectReferenceType
   The object reference type points to an object declared in COBOL as USAGE IS INDEX OBJECT REFERENCE METACLASS OF class-name-1" where class-name-1 is optional
Derived from COBOLSimpleType
Public Attributes:
className: String
   Refers to the name of the object this instance refers to.
COBOLSourceText
   This class contains the entire source code (including comments) and its associated line number.
Public Attributes:
source: String
fileName: String
COBOLUnicodeType
   The Unicode type reperesents data stored in Unicode format.

Derived from COBOLSimpleType
COBOLInternalFloatType
   The COBOLInternalFloat type captures the way floating points are represented in memory. For example, the value 123.45 is represented internally as 12345 with the implied decimal marked between 3 and 4.
   Possible usage values for this class are 'float' and 'double', which are represented by comp-1 and comp-2 declarations, respectively.
Derived from COBOLSimpleType
COBOLExternalFloatType
   The COBOLExternalFloat type captures the way floating points are displayed to the user. COBOLExternalFloatTypes are the same as COBOLNumericEditedTypes with the exception that the PIC has a +/- sign before the mantissa and the exponent. For example, the value 123.45 may be represented in ExternalFloatType as +12345 E -2
   Possible usage values for this class are 'binary', 'packed-Decimal' and 'display'.
Derived from COBOLSimpleType
COBOLAddressingType
   COBOLAddressingType is used for index values, pointer values, and procedurePointer values.
   Possible usage values for this class are 'index', 'pointer', and 'procedurePointer'.
Derived from COBOLSimpleType
COBOLElementInitialValue
Derived from TDLangElement
Public Attributes:
initVal: String
valueKind: COBOLInitialValueKind=string_value
TOTALS:
1 Logical Packages
23 Classes
LOGICAL PACKAGE STRUCTURE
Logical View
   cobol
   TDLang 6. Illustrative Applications of the Common Application Metamodel and System Various complex transaction, occurring across a plurality of individual platforms require the seamlessness and transparency of the Common Application Metamodel. These transactions include "rich" transactions, high level group ware, and financial transactions.

FIG. 16 illustrates a simplified network configuration for a "rich" transaction where, for example, an order is entered at a terminal, and is passed to and through a Web server to a manufacturer's application server. The manufacturer's application server searches through it's own database server, as well as its vendors' dissimilar and incompatible database servers and databases, transparently connected by the connectors described herein, querying for statuses, prices, and delivery dates, of components, and placing orders for needed components to satisfy the order.

Strictly for purposes of illustration and not limitation, a rich transaction is illustrated with the purchase of an automobile, from configuring and ordering the new automobile through financing the automobile, collecting the elements and components the new automobile, assembling the automobile, and delivering it to the customer. In configuring the automobile, consider the inclusion of, e.g., a traction control module, which may require the inclusion of one sub-set of engines, while precluding the inclusion of another sub-set of engines, for example, for technical or performance reasons. Similarly, the selection of one color may preclude the selection of certain upholstery combinations, for example, for reasons of inventory or availability. Of course, if you don't select an engine and a transmission, you don't have an automobile. Certain choices must be made. The problem is one of "If you pick 'X', you must also pick 'Y' and 'Z', but if you pick 'Y', you can not get 'A' or 'B', and you have already selected 'A'." That is, selection of one component or sub-system may remove some previously selected components or sub-systems from the system. After configuring the car, frequently based on the availability of selected elements in the supply pipeline, the order is sent to the manufacturer's server for fulfillment, including manufacturing scheduling. The manufacturer would query the vendors in the supply chain, for example, a transmission vendor, who would, in turn, query controller vendors, gear vendors, housing vendors, hydraulic conduit vendors, and the like. These vendors would, in turn query their sub-vendors.

Using the connector method and system, the dealer and customer would configure and order the car at a terminal 3901. The configuration and order entry would be sent to the manufacturer's server 3911. The manufacturer's server queries the servers 3921, 3931, and 3441, (where server 3921 could be the server for the manufacturer's in house components business and for its purchasing function) or its direct vendors, who in turn query third sub-vendors, 3923, 3933, and 3933. The queries could be in the form of "fill in the blank" SQL queries, subject to access authorizations. The sub-vendor servers, 3923, 3933, and 3443 specialized views to the vendor's servers 3921, 3931, 3441, as clients, which in turn would present specialized views to the manufacturer's server 3911 as a client. The data returned to the manufacturer's server 3911 could be optimized with optimization and production scheduling applications, to present a serial number and delivery date to the buyer at the dealer's server.

A further application of the connectors of the present invention is in connection with groupware, and especially linking "islands of groupware" together. "Groupware" is a broad term applied to technology that is designed to facilitate the work of groups. Groupware technology may be used to communicate, cooperate, coordinate, solve problems, compete, or negotiate. A Groupware suite of applications is comprised of programs that help people work together collectively, even if located remotely from each other. Groupware services can include the sharing of calendars, collective writing, e-mail handling, shared database access, electronic meetings, video conferencing, and other activities.

FIG. 17 illustrates a group ware session spread across multiple group ware applications running on multiple, disparate platforms, and connected by the connectors described herein. Specifically illustrated are two groupware systems 4010 and 4020. Each system contains e-mail enables applications, 4013 and 4023, such as e-mail, schedule/calendar, word processor, spread sheet, graphics, and CTI (computer telephony integration). These are supported by message API's 4015, 4025 and operating systems, 4017 and 4027, and local groupware servers 4011 and 4021. Each of the local groupware servers, 4011 and 4021, has a connector of the present invention, an e-mail server, an e-mail data base, a directory server, and a replication database. The two groupware servers 4011 and 4021 communicate over a telecommunications medium, as the Net, a LAN, a WAN, or even the PSTN.

E-mail is by far the most common and basic groupware application. While the basic technology is designed to pass simple messages between people, even relatively simple e-mail systems today typically include features for forwarding messages, filing messages, creating mailing groups, and attaching files with a message. Other features that have been explored include content based sorting and processing of messages, content based routing of messages, and structured communication (messages requiring certain information).

Workflow systems are another element of groupware. Work flow systems allow documents to be routed through organizations through a relatively-fixed process. A simple example of a workflow application is an expense report in an organization: an employee enters an expense report and submits it, a copy is archived then routed to the employee's manager for approval, the manager receives the document, electronically approves it and sends it on and the expense is registered to the group's account and forwarded to the accounting department for payment. Workflow systems may provide features such as routing, development of forms, and support for differing roles and privileges.

Hypertext is a system for linking text documents to each other, with the Web being an obvious example. However, whenever multiple people author and link documents, the system becomes group work, constantly evolving and responding to others' work. Another common multi-user feature in hypertext (that is not found on the Web) is allowing any user to create links from any page, so that others can be informed when there are relevant links that the original author was unaware of.

Group calendaring is another aspect of groupware and facilitates scheduling, project management, and coordination among many people, and may provide support for scheduling equipment as well. Typical features detect when schedules conflict or find meeting times that will work for everyone. Group calendars also help to locate people.

Collaborative writing systems may provide both realtime support and non-realtime support. Word processors may provide asynchronous support by showing authorship and by allowing users to track changes and make annotations to documents. Authors collaborating on a document may also be given tools to help plan and coordinate the authoring process, such as methods for locking parts of the document or linking separately-authored documents. Synchronous support allows authors to see each other's changes as they make them, and usually needs to provide an additional communication channel to the authors as they work.

Group may be synchronous or real time, such as shared whiteboards that allow two or more people to view and draw on a shared drawing surface even from different locations. This can be used, for instance, during a phone call, where each person can jot down notes (e.g. a name, phone number, or map) or to work collaboratively on a visual problem. Most shared whiteboards are designed for informal conversation, but they may also serve structured communications or more sophisticated drawing tasks, such as collaborative graphic design, publishing, or engineering applications. Shared whiteboards can indicate where each person is drawing or pointing by showing telepointers, which are color-coded or labeled to identify each person.

A further aspect of groupware is video conferencing. Video conferencing systems allow two-way or multi-way calling with live video, essentially a telephone system with an additional visual component, with time stamping for coordination.

Decision support systems are another aspect of groupware and are designed to facilitate groups in decision-making. They provide tools for brainstorming, critiquing ideas, putting weights and probabilities on events and alternatives, and voting. Such systems enable presumably more rational and evenhanded decisions. Primarily designed to facilitate meetings, they encourage equal participation by, for instance, providing anonymity or enforcing turn-taking.

Multi-player games have always been reasonably common in arcades, but are becoming quite common on the Internet. Many of the earliest electronic arcade games were multi-user, for example, Pong, Space Wars, and car racing games. Games are the prototypical example of multi-user situations "non-cooperative", though even competitive games require players to cooperate in following the rules of the game. Games can be enhanced by other communication media, such as chat or video systems.

Some product examples of groupware include Lotus Notes and Microsoft Exchange, both of which facilitate calendar sharing, e-mail handling, and the replication of files across a distributed system so that all users can view the same information.

What makes the connectors of the present invention particularly attractive for groupware applications is the diversity of groupware offerings and group server architectures, implementations, and platforms. The connector of the invention can act as a front end or gateway to the groupware server.

FIG. 18 illustrates a commercial transaction where real goods are shipped from a seller to a buyer, and various forms of electronic payment and secured electronic payment are used by the buyer to pay the seller, with banks and financial institutions connected through the connectors described herein. Specifically, a merchant or manufacturer 4101 sells a product to a customer 4103 that he has no "history" with. The product is shipped 4605. However, the buyer 4103 does not wish to be parted from his money until the goods are received, inspected, approved, and "accepted", while the seller 4101 does not want to give up control of the goods until he has been paid. This fundamental commercial conflict has led to various paradigms, most involving hard copy "near moneys" or instruments of one form or another. Today, the financial transactions are most frequently those involving electronic fund transfers, and electronic versions of notes, instruments, negotiable instruments, documentary drafts, payment orders, letters of credit, warehouse receipts, delivery orders, bills of lading, including claims on goods, that is, documents of title that purport to transfer title or physical custody of goods to the bearer or to a named person, and security interests in goods. Typically, the customer 4103 executes an instrument in favor of the seller 4101, directing the buyer's bank 4121 to pay buyer's money to the seller 4101 through seller's bank 4125. Normally, this is a simple electronic transaction between buyers and sellers who have dealt with each other before, dealing through banks or financial intermediaries who have dealt with each other before, and who are using the same or compatible software applications. However, in the extraordinary case where these preconditions are not satisfied, the connectors of the invention facilitate the electronic, bank-to-bank, side of the transaction.

While the invention has been described and illustrated with respect to applications having a single level of application program interfaces or converters, it is, of course, to be understood that such application program interfaces or converters may be present at various levels in the processing hierarchy, for example between Web Clients and Web servers, between web servers and application servers, between application servers and database servers, and between application servers or database servers or both and various specialized repositories.

It is also to be understood, that while the invention has been described and illustrated with respect to certain preferred embodiments and exemplification having individual clients and individual servers, there may be multiple clients, multiple servers, and applications that function as both clients and servers, as exemplified by groupware applications, and there might be multiple parallel lines and/or multiple hierarchical levels of application servers, data servers, and databases, as in systems for rich transactions.

While the invention has been described with respect to certain preferred embodiments and exemplifications, it is not intended to limit the scope of the invention thereby, but solely by the claims appended hereto.

We claim:

1. A method of processing an application request on an end user application and an application server comprising:
    a) initiating the application request on the end user application in a first language with a first application program;
    b) transmitting the application request to the application server and converting the application request from the first language of the first end user application to COBOL running on the application server;
    c) processing said application request on the application server;
    d) transmitting a response to the application request from the application server to the end user application, and converting the response to the application request from the COBOL running on the application server to the first language of the first end user application; and
    e) wherein the end user application and the application server have at least one connector therebetween, and the steps of (i) converting the application request from the first language of the first end user application as a source language to the COBOL running on the application server as a target language, and (ii) converting a response to the application request from the COBOL running on the application server as a source language to the first language of the first end user application as a target language, each comprise the steps of:
        1) invoking connector metamodels of respective source and target languages;
        2) populating the connector metamodels with metamodel data of each of the respective source and target languages; and
        3) converting the source language to the target language.

2. The method of claim 1 wherein the end user application is a web browser.

3. The method of claim 2 wherein the end user application is connected to the application server through a web server, and the web server comprises a connector.

4. The method of claim 1 wherein the metamodel metadata comprises invocation metamodel metadata, application domain interface metamodel metadata, and type descriptor metamodel metadata.

5. The method of claim 4 wherein the invocation metamodel metadata is chosen from the group consisting of message control information, security data, transactional semantics, trace and debug information, pre-condition and post-condition resources, and user data.

6. The method of claim 4 wherein the application domain interface metamodel metadata comprises input parameter signatures, output parameter signatures, and return types.

7. The method of claim 4 wherein the application domain interface metamodel metadata further includes language metamodel metadata.

8. The method of claim 7 wherein the language metamodel metadata includes mappings between the source and target languages.

9. The method of claim 8 wherein the source language is object oriented, and the language metamodel metadata maps encapsulated objects into code and data.

10. The method of claim 9 wherein the language metamodel metadata maps object inheritances into references and pointers.

11. The method of claim 4 wherein the type descriptor metamodel metadata defines physical realizations, storage mapping, data types, data structures, and realization constraints.

12. The method of claim 1 wherein processing the application request relates to a rich transaction comprising a plurality of individual transactions, and wherein the plurality of individual transactions are processed on one end user application and a plurality of application servers.

13. The method of claim 12 comprising passing individual transactions among individual application servers.

14. A transaction processing system comprising a client, a server, and at least one connector therebetween,
   a) the client having an end user application, and being controlled and configured to initiate an application request with the server in a first language with a first application program and to transmit the application request to the server;
   b) the connector being configured and controlled to receive the application request from the client, convert the application request from the first language of the first end user application running on the client to COBOL running on the server;
   c) the server being configured and controlled to receive the converted application request from the connector and process the application request in COBOL with a second application program residing on the server, and to thereafter transmit a response to the application request through the connector back to the first application program on the client;
   d) the connector being configured and controlled to receive the response to the application request from the server, to convert the response to the application request from the COBOL running on the application server to the first language of the first application program running on the client; and
   e) wherein the connector between the client and the server is configured and controlled to (i) convert the application request from the first language of the first application on the client as a source language to the COBOL running on the application server as a target language, and (ii) convert the response to the application request from the COBOL running on the application server as a source language to the first language of the first application running on the client as a target language, each by a method comprising:
      1) retrieving connector metamodels of respective source and target languages from a metamodel metadata repository;
      2) populating the connector metamodels with metamodel data from the metamodel metadata repository for each of the respective source and target languages; and
      3) invoking the retrieved, populated connector metamodels and converting the source language to the target language.

15. The system of claim 14 wherein the end user application is a web browser.

16. The system of claim 15 wherein the end user application is connected to the application server through a web server, and the web server comprises a connector.

17. The system of claim 14 wherein the metamodel metadata comprises invocation metamodel metadata, application domain interface metamodel metadata, and type descriptor metamodel metadata.

18. The system of claim 17 wherein the invocation metamodel metadata is chosen from the group consisting of message control information, security data, transactional semantics, trace and debug information, pre-condition and post-condition resources, and user data.

19. The system of claim 18 wherein the type descriptor metamodel metadata defines physical realizations, storage mapping, data types, data structures, and realization constraints.

20. The system of claim 17 wherein the application domain interface metamodel metadata comprises input parameter signatures, output parameter signatures, and return types.

21. The system of claim 17 wherein the application domain interface metamodel metadata further includes language metamodel metadata.

22. The system of claim 21 wherein the language metamodel metadata includes mappings between the source and target languages.

23. The system of claim 22 wherein the source language is object oriented, and the language metamodel metadata maps encapsulated objects into code and data.

24. The system of claim 23 wherein the language metamodel metadata maps object inheritances into references and pointers.

25. The system of claim 14 wherein said system has a plurality of application servers and is configured and controlled to process rich transactions.

26. A transaction processing system configured and controlled to interact with a client application, and comprising a server and at least one connector between the server and the client application, wherein:
   a) the client has an end user application, and is controlled and configured to initiate an application request with the server in a first language with a first application program and to transmit the application request to the server;
   b) the connector being configured and controlled to receive the application request from the client, convert the application request from the first language of the first end user application running on the client to the COBOL running on the server;
   c) the server being configured and controlled to receive the converted application request from the connector and process the application request in the COBOL with a second application program residing on the server, and to thereafter transmit a response to the application request through the connector back to the first application program on the client;
   d) the connector being configured and controlled to receive the response to the application request from the server, to convert the response to the application request from the COBOL running on the server to the first language of the first application program running on the client; and
   e) wherein the connector between the client and the server is configured and controlled to (i) convert the application request from the first language of the client application on the client as a source language to the COBOL running on the server as a target language, and (ii) convert the response to the application request from the COBOL running on the server as a source language to the first language of the client application running on the client as a target language, each by a method comprising:
1) retrieving connector metamodel metadata of respective source and target languages from a metamodel metadata repository;
2) populating the connector metamodels with metamodel data of each of the respective source and target languages from the metamodel metadata repository and invoking the retrieved, populated connector metamodels; and
3) converting the source language to the target language.

27. The system of claim 26 wherein the end user application is a web browser.

28. The system of claim 27 wherein the end user application is connected to the application server through a web server, and the web server comprises a connector.

29. The system of claim 26 wherein the metamodel metadata comprises invocation metamodel metadata, application domain interface metamodel metadata, and type descriptor metamodel metadata.

30. The system of claim 29 wherein the invocation metamodel metadata is chosen from the group consisting of message control information, security data, transactional semantics, trace and debug information, pre-condition and post-condition resources, and user data.

31. The system of claim 29 wherein the application domain interface metamodel metadata comprises input parameter signatures, output parameter signatures, and return types.

32. The system of claim 29 wherein the application domain interface metamodel metadata further includes language metamodel metadata.

33. The system of claim 32 wherein the language metamodel metadata includes mappings between the source and target languages.

34. The system of claim 33 wherein the source language is object oriented, and the language metamodel metadata maps encapsulated objects into code and data.

35. The method of claim 33 wherein the source language and the target language are different object oriented languages, and the language metamodel metadata maps encapsulated code and data between the languages.

36. The system of claim 33 wherein the language metamodel metadata maps object inheritances into references and pointers.

37. The system of claim 29 wherein the type descriptor metamodel metadata defines physical realizations, storage mapping, data types, data structures, and realization constraints.

38. The system of claim 26 wherein said system has a plurality of application servers and is configured and controlled to process rich transactions.

39. A program product comprising a computer-readable storage medium having invocation metamodel metadata, application domain interface metamodel metadata, and language metamodel metadata;
computer instructions for building a metamodel metadata repository of source and target language metamodel metadata; and
computer instructions to build a connector for:
1) retrieving connector metamodel metadata of respective source and target languages from the metamodel metadata repository;
2) populating the connector metamodels with metamodel data of each of the respective source and target languages from the metamodel metadata repository and invoking the retrieved, populated connector metamodels; and
3) converting the source language to the target language.

40. The program product of claim 39 wherein the computer-readable storage medium includes computer instructions for building connector stubs from said metamodel metadata.

41. The program product of claim 39 wherein the metamodel metadata in the repository comprises invocation metamodel metadata, application domain interface metamodel metadata, and type descriptor metamodel metadata.

42. The program product of claim 41 wherein the invocation metamodel metadata is chosen from the group consisting of message control information, security data, transactional semantics, trace and debug information, pre-condition and post-condition resources, and user data.

43. The program product of claim 42 wherein the type descriptor metamodel metadata defines physical realizations, storage mapping, data types, data structures, and realization constraints.

44. The program product of claim 41 wherein the application domain interface metamodel metadata comprises input parameter signatures, output parameter signatures, and return types.

45. The program product of claim 41 wherein the application domain interface metamodel metadata further includes language metamodel metadata.

46. The program product of claim 45 wherein the language metamodel metadata includes mappings between the source and target languages.

47. The program product of claim 46 wherein the source language is object oriented, and the language metamodel metadata maps encapsulated objects into code and data.

48. The program product of claim 46 wherein the language metamodel metadata maps object inheritances into references and pointers.

49. The program product of claim 39 wherein the source language is COBOL.

50. The program product of claim 39 wherein the target language is COBOL.

* * * * *